(12) United States Patent
Sarkar et al.

(10) Patent No.: US 11,435,823 B2
(45) Date of Patent: Sep. 6, 2022

(54) EYE-TRACKER WITH IMPROVED BEAM SCANNING AND METHOD THEREFOR

(71) Applicant: AdHawk Microsystems, Kitchener (CA)

(72) Inventors: Niladri Sarkar, Waterloo (CA); Nino Zahirovic, Waterloo (CA); Fan Yang, London (CA)

(73) Assignee: ADHAWK MICROSYSTEMS, Kitchener (CA)

(*) Notice: Subject to any disclaimer, the term of this patent is extended or adjusted under 35 U.S.C. 154(b) by 0 days.

(21) Appl. No.: 17/143,048

(22) Filed: Jan. 6, 2021

(65) Prior Publication Data
US 2021/0124416 A1    Apr. 29, 2021

Related U.S. Application Data

(63) Continuation-in-part of application No. 17/087,302, filed on Nov. 2, 2020, which is a continuation of
(Continued)

(51) Int. Cl.
| G06F 3/01 | (2006.01) |
| G02B 26/10 | (2006.01) |
| G02B 27/00 | (2006.01) |
| G02B 26/08 | (2006.01) |
| G02B 27/01 | (2006.01) |

(52) U.S. Cl.
CPC ......... *G06F 3/013* (2013.01); *G02B 26/0833* (2013.01); *G02B 26/105* (2013.01); *G02B 27/0093* (2013.01); *G02B 27/0172* (2013.01); *G02B 27/0176* (2013.01); *G02B 2027/0178* (2013.01)

(58) Field of Classification Search
CPC ... G06F 3/013; G02B 26/0833; G02B 26/105; G02B 27/0093; G02B 27/0172; G02B 27/0176; G02B 2027/0178
See application file for complete search history.

(56) References Cited

U.S. PATENT DOCUMENTS

| 5,638,176 A | 6/1997 | Hobbs et al. |
| 7,388,699 B1 | 6/2008 | Coffee |
| (Continued) | | |

OTHER PUBLICATIONS

Final Rejection dated Jun. 15, 2020 for U.S. Appl. No. 15/876,148.
(Continued)

*Primary Examiner* — Stephen G Sherman
(74) *Attorney, Agent, or Firm* — Kaplan Breyer Schwarz, LLP

(57) ABSTRACT

The present disclosure describes systems and methods that enable eye-tracking by steering a light signal in a high-density Lissajous pattern over a region of an eye and detecting light reflected from the eye using a non-imaging photodetector configuration. The light signal is scanned by driving each axis of a two-axis MEMS scanner with a periodic signal having a frequency that is based on the resonant frequency of that axis. By choosing periodic signals having frequencies that give rise to precession of the Lissajous pattern at a high rate, a high-density scan pattern is quickly generated, thereby enabling eye tracking with high spatial resolution and low latency.

20 Claims, 18 Drawing Sheets

Related U.S. Application Data application No. 15/876,148, filed on Jan. 20, 2018, now Pat. No. 10,824,229.

(60) Provisional application No. 62/448,577, filed on Jan. 20, 2017, provisional application No. 63/134,467, filed on Jan. 6, 2021, provisional application No. 62/957,696, filed on Jan. 6, 2020.

(56) References Cited

U.S. PATENT DOCUMENTS

| | | |
|---|---|---|
| 10,824,229 B2 | 11/2020 | Sarkar |
| 2002/0014579 A1 | 2/2002 | Dunfield |
| 2004/0061831 A1 | 4/2004 | Aughey et al. |
| 2004/0120023 A1 | 6/2004 | Bush et al. |
| 2007/0001248 A1 | 1/2007 | Geisberger et al. |
| 2007/0081241 A1 | 4/2007 | Hayashi |
| 2008/0266818 A1 | 10/2008 | Collet et al. |
| 2009/0062658 A1 * | 3/2009 | Dunki-Jacobs .... G02B 26/0833 600/476 |
| 2013/0242364 A1 | 9/2013 | Kilcher et al. |
| 2015/0047078 A1 | 2/2015 | Lee et al. |
| 2015/0235355 A1 | 8/2015 | Mullins |
| 2016/0029883 A1 | 2/2016 | Cox |
| 2016/0166146 A1 | 6/2016 | Sarkar |
| 2016/0240013 A1 | 8/2016 | Spitzer |
| 2017/0038253 A1 | 2/2017 | Mallinson |
| 2017/0067609 A1 | 3/2017 | Ichikawa et al. |
| 2017/0115483 A1 | 4/2017 | Aleem et al. |
| 2017/0123489 A1 | 5/2017 | Guenter |
| 2017/0364732 A1 | 12/2017 | Komogortsev |
| 2018/0189977 A1 | 7/2018 | Zecchini et al. |
| 2018/0210547 A1 | 7/2018 | Sarkar |
| 2019/0120940 A1 | 4/2019 | Pei et al. |
| 2019/0204913 A1 | 7/2019 | Sarkar et al. |

OTHER PUBLICATIONS

Final Rejection received for U.S. Appl. No. 15/876,148, dated Aug. 23, 2019, 11 pages.
Non-Final Office Action received for U.S. Appl. No. 15/876,148, dated Feb. 24, 2020, 15 pages.
Non-Final Rejection received for U.S. Appl. No. 15/876,148, dated May 3, 2019, 9 pages.
Notice of Allowance and Fees Due (PTOL-85) dated Jul. 16, 2020 for U.S. Appl. No. 15/876,148.
Notice of Allowance and Fees Due (PTOL-85) dated Mar. 23, 2022 for U.S. Appl. No. 17/087,302.
Notice of Allowance and Fees Due (PTOL-85) dated Oct. 7, 2020 for U.S. Appl. No. 16/236,993.
Jacob Engelberg et al., "The Advantages of metalenses over diffractive lenses," "Nature Communications", vol. 11, dated 2020 (https://doi.org/10.1038/s41467-020-15972-9), 4 pp.
Non-Final Rejection dated Apr. 29, 2021 for U.S. Appl. No. 16/232,410.
Non-Final Rejection dated Jun. 18, 2020 for U.S. Appl. No. 16/236,993.
Non-Final Rejection dated Oct. 27, 2020 for U.S. Appl. No. 16/234,293.
Notice of Allowance and Fees Due (PTOL-85) dated Mar. 5, 2021 for U.S. Appl. No. 16/234,293.
Notice of Allowance dated Oct. 20, 2021 for U.S. Appl. No. 16/232,410.
Zhaoyi Li et al., "Meta-Optics achieves RGB-achromatic focusing for virtual reality," Science Advances, vol. 7, No. 5, Jan. 27, 2021 (www.doi.org/10.1126/sciadv.abe4458), 8 pp.
Non-Final Rejection dated Sep. 3, 2021 for U.S. Appl. No. 17/087,302.

* cited by examiner

EYE-TRACKER WITH IMPROVED BEAM SCANNING AND METHOD THEREFOR

CROSS REFERENCE TO RELATED APPLICATIONS

This application is a continuation-in-part of U.S. Non-Provisional patent application Ser. No. 17/087,302, filed Nov. 2, 2020, which is a continuation of U.S. Non-Provisional patent application Ser. No. 15/876,148 (now U.S. Pat. No. 10,824,229), filed Jan. 20, 2018, which claims the benefit of U.S. Provisional Patent Application Ser. No. 62/448,577 filed Jan. 20, 2017, each of which is incorporated by reference as if set forth at length herein.

This application also claims the benefit of U.S. Provisional Patent Application Ser. No. 62/957,696 filed Jan. 6, 2020 and U.S. Provisional Patent Application Ser. No. 63/134,467 filed Jan. 6, 2021, each of which is incorporated by reference as if set forth at length herein.

If there are any contradictions or inconsistencies in language between this application and one or more of the cases that have been incorporated by reference that might affect the interpretation of the claims in this case, the claims in this case should be interpreted to be consistent with the language in this case.

TECHNICAL FIELD

This disclosure relates generally to human-computer interfaces and more specifically to eye-tracking systems, methods and structures that advantageously provide rapid, high-accuracy measurements of eye position without the need for time-consuming image processing.

BACKGROUND

The movement of the human eye can reveal a wealth of information about the neural mechanisms of the brain and vision, as well as an individual's neurological health, ocular health, interests, and state-of-mind. In addition, the tracking of eye movement can be used to improve/augment human-computer interaction, enable gaze-based man-machine interfaces, and enhance how we interact with wearable technology. For example, gaze tracking, which relies on eye tracking, enables many augmentative alternative communication (AAC) devices that improve the ability for individuals lacking speech capability and/or motor skills (e.g., amyotrophic lateral sclerosis (ALS) patients or those with spinal cord injuries) to interact with the world around them.

Unfortunately, conventional eye-trackers are slow, bulky, invasive, and/or restrictive for the user. This makes them difficult, if not impossible to use in many of the applications discussed above. In addition, conventional systems generally require cameras and imaging processing software. As a result, they tend to be expensive, slow, and power hungry. Furthermore, they typically exhibit significant lag between eye movement and measured eye position, which degrades the user experience in VR applications. It is possible to improve the resolution and speed of such eye tracking systems but, to date, these improvements have come at the expense of user mobility and added system cost.

Accordingly, systems, methods and structures that facilitate the development of low cost, precise eye tracking at a high rate would represent a welcome addition to the art.

SUMMARY

The present disclosure enables an eye tracker that scans a light signal in a two-dimensional scan pattern over a region of an eye and tracks the motion of the eye by detecting one or more reflections from the eye. The scan pattern is configured to enable movement of the eye to be tracked with low temporal latency and high spatial resolution.

An advance over the prior art is realized by scanning the light signal over the eye region in a Lissajous pattern that precesses at a high rate using a two-axis, resonant MEMS scanner, where one axis is characterized by a first resonant frequency and the other axis is characterized by a second, different resonant frequency. Each axis is driven with a periodic signal having a drive frequency that is near the resonant frequency of that axis. The drive frequencies are selected to cause a rapid precession of the pattern, which results in a high-density scan pattern in only a few periods of the drive frequencies.

An illustrative embodiment in accordance with the present disclosure is an eye-tracking system comprising a light source for providing an optical signal, a two-axis, resonant MEMS scanner for steering the optical signal in a scan pattern over a region of an eye, a photodetector configuration that includes a non-imaging photodetector, and a processing system that is configured to drive each axis of the scanner with a periodic signal having a different drive frequency and determine a gaze vector of the eye based on the timing and amplitude of the light reflected from the region and detected by the photodetector configuration.

The MEMS scanner includes a two-axis, gimbal-mounted mirror having first and second orthogonal axes of rotation characterized by first and second resonant frequencies, respectively. To scan the light signal over the eye region in a Lissajous pattern, the mirror is driven about the first axis by a first rotational actuator driven with a first periodic drive signal having a first drive frequency based on the first resonant frequency and about the second axis by a second rotational actuator driven with a second periodic drive signal having a second drive frequency based on the second resonant frequency. The first and second drive frequencies are selected to realize a Lissajous pattern that precesses at a rapid rate. In some embodiments, the MEMS scanner includes a diffractive optical element (DOE) rather than a mirror.

In some embodiments, the photodetector configuration includes a plurality of photodetectors that is arranged such that each can receive reflections (e.g., specular reflections from the cornea, diffuse reflections form the iris, etc.) from the eye region.

A method in accordance with the present disclosure includes determining resonant frequencies for each axis of the scanner and developing candidate drive frequencies by adding a small frequency offset to each resonant frequency. Sets of test frequencies for the axes are established where each set is within a frequency range around its respective candidate frequency. Every combination of test frequencies for the two axes are then analyzed to determine the spatiotemporal density of a Lissajous formed using these frequencies for the drive signals applied to the scanner. One test-frequency set is then selected for use in the drive signals for the scanner, where the test-frequency set chosen is selected based on a scan pattern parameter, such as spatiotemporal density, the time required for the largest gap within the scan pattern to converge below a user-defined feature size, the size of the largest gap within the scan pattern at some user-defined scan time, the rate at which the scan pattern precesses, and the like.

An embodiment in accordance with the present disclosure is an eye-tracking method comprising: identifying a first location of a cornea of an eye, the cornea having a corneal surface; scanning a light signal in scan pattern over a region of the eye through the effect of a microelectromechanical system (MEMS) device that is a two-axis device having a first axis characterized by a first resonant frequency and a second axis characterized by a second resonant frequency, wherein the scan pattern is a Lissajous pattern, and wherein the light signal is scanned by driving the first axis with a first periodic signal having a first drive frequency and driving the second axis with a second periodic signal having a second drive frequency; and detecting a first corneal glint reflected from the corneal surface with a non-imaging photodetector configuration.

Another embodiment in accordance with the present disclosure is an eye tracker comprising: a light source for providing a light signal; a scanner for steering the light signal in a Lissajous pattern over a region of an eye, wherein the scanner comprises a micromechanical system (MEMS) device that is a two-axis device having a first axis characterized by a first resonant frequency and a second axis characterized by a second resonant frequency; a non-imaging photodetector configuration that is configured to provide at least one output signal based on a reflected signal from the region; and a processing system configured to: (i) drive the first axis with a first periodic signal that is characterized by a first drive frequency; (ii) drive the second axis with a second periodic signal that is characterized by a second drive frequency; and (iii) determine a gaze direction of the eye based on the output signal.

DETAILED DESCRIPTION

Figure 1:
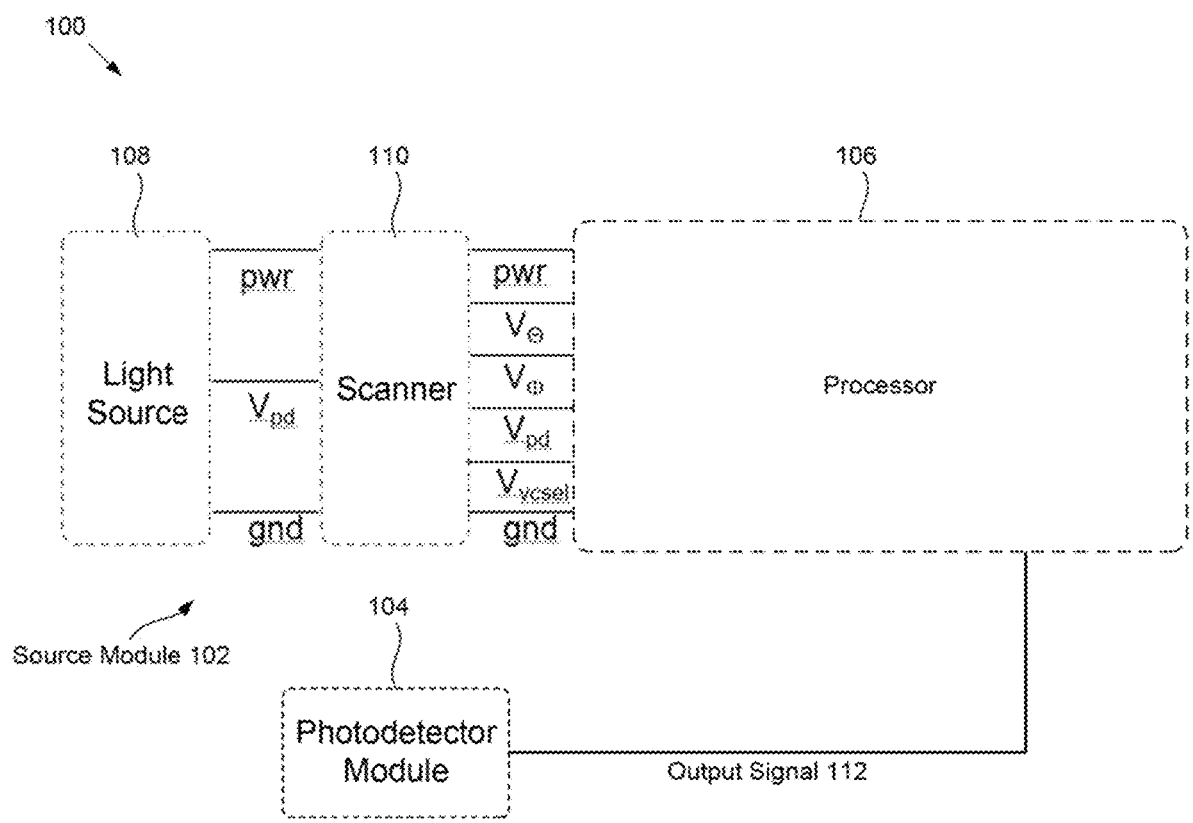
FIG. 1 depicts a schematic block diagram illustrating an eye tracking system according to aspects of the present disclosure.

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

The functions of the various elements shown in the Drawing, including any functional blocks that may be labeled as "processors", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

Unless otherwise explicitly specified herein, the figures comprising the drawing are not drawn to scale.

FIG. 1 depicts a schematic block diagram illustrating an eye tracking system according to aspects of the present disclosure. As will be apparent to those skilled in the art by inspection of this figure, such illustrative systems constructed according to aspects of the present disclosure exhibit substantial improvements in size, cost, power consumption, bandwidth and precision as compared with prior art eye-tracking systems.

In the depicted example, eye-tracking system 100 includes source module 102, photodetector module 104, and processor 106, among other elements (e.g., memory, power module, etc.).

Source module 102 includes light source 108 and scanner 110.

Light source 108 is a conventional light source configured for providing a suitable light signal to scanner 110. In the depicted example, light source 108 provides a light signal having approximately 1 mW of optical power at 940 nm. The light signal has a Full-Width-at-Half-Maximum (FWHM) divergence of approximately 20 degrees, which is collimated and redirected toward scanner 110 by an Off-Axis-Parabola (OAP) that is integrated in the package, as discussed below. After it reflects off the OAP, the light signal has a divergence of approximately 1-2 degrees. It should be noted, however, that light source 108 can be any of any variety known in the art without departing from the scope of the present disclosure.

Scanner 110 is a two-axis resonant MEMS scanning mirror that is configured to receive the light signal and scan it in a two-dimensional scan pattern over a region of an eye being tracked. As discussed in more detail below, scanner 110 includes first and second rotation axes, each of which is characterized by a resonant frequency, and each of which is driven with a periodic signal whose drive frequency is close to the resonant frequency of its respective axis. Emphasizing simple design principles according to the present disclosure, scanner 110 is preferably a two-axis, resonant microelectromechanical system (MEMS) device having two orthogonal rotation axes.

Photodetector module 104 includes one or more non-imaging photodetectors configured to receive a portion of the light signal that is reflected from the eye region and provide output signal 112 to processor 106. In the depicted example, photodetector module 104 includes a single non-imaging, discrete photodetector. For the purposes of this disclosure, including the appended claims, a "discrete detector" is defined as an optoelectronic device having no more than four electrically independent detection regions on a single substrate, where each detection region is operative for providing one electrical signal whose magnitude is based on the intensity of light incident upon that detection region. Examples of discrete detectors include detectors having only one detection region, split detectors having two detection regions, four-quadrant detectors having four detection regions, and position-sensitive detectors. The definition of discrete detector explicitly excludes individual pixels, or groups of pixels, within array devices for collectively providing spatially correlated image information (i.e., imaging detectors), such as focal-plane arrays, image sensors, and the like.

In some embodiments, photodetector module 104 includes multiple non-imaging photodetectors that provide multiple output signals to the processor. Photodetector 104 can be any of any variety known in the art without departing from the scope of the present disclosure. Although the depicted example includes a photodiode module having a single photodiode, in some embodiments, multiple photodiodes are used to provide a richer data set for position of the eye.

As illustrated, processor 106 is communicatively coupled to scanner 110 via a number of signal lines namely, pwr, $V_\theta$, $V_\varphi$, $V_{pd}$, $V_{vcsel}$, and gnd, which correspond to electrical power, driving voltages ($\theta$ $\varphi$) for MEMS diffractive optic element, driving voltages for photodetector and vertical cavity surface emitting laser (VCSEL) and ground signals respectively. Note that for simplicity, individual elements comprising the module(s) are not specifically shown in this illustrative figure namely, the MEMS scanning device, photodetector, VCSEL etc. Similarly, scanner 110 is communicatively coupled to light source 108 via pwr, gnd, and $V_{pd}$ signals. As we shall show and describe, the modules containing the scanner and photodetector are located and operated a physical distance apart from one another.

Processor 106 is a controller/processor configured to drive the components of source module 102 with appropriate drive signals, receive output signal 112 from photodetector module 104, and generate an estimate of the gaze vector of an eye being monitored with system 100 based on output signal 112, among other functions.

In some embodiments, processor 106 includes one or more components containing processing and control circuitry that can include hardware structured to execute functions in accordance with the present disclosure. In some embodiments, such circuitry can include machine-readable media for configuring the hardware to execute the functions described herein. Furthermore, the processing circuitry of processor 106 can be embodied as one or more circuitry components including, but not limited to, processing circuitry, network interfaces, peripheral devices, input devices, output devices, sensors, etc. In some embodiments, such processing circuitry can take the form of one or more analog circuits, electronic circuits (e.g., integrated circuits (IC), application-specific integrated-circuits (ASICs), discrete circuits, system on a chip (SOCs) circuits, etc.), telecommunication circuits, hybrid circuits, and any other type of "circuit," or combinations thereof. In this regard, "processing circuitry" can include one or more of any type of component for accomplishing or facilitating achievement of operations in accordance with the present disclosure. For example, a circuit as described herein can include one or more transistors, logic gates (e.g., NAND, AND, NOR, OR, XOR, NOT, XNOR, etc.), resistors, multiplexers, registers, capacitors, inductors, diodes, wiring, and so on).

"Processing circuitry" can also include one or more processors and/or controllers communicably coupled to one or more memory or memory devices. In this regard, the one or more processors can execute instructions stored in the memory or can execute instructions otherwise accessible to the one or more processors. In some embodiments, the one or more processors can be embodied in various ways. The one or more processors can be constructed in a manner sufficient to perform at least the operations described herein. In some embodiments, the one or more processors can be shared by multiple circuits (e.g., circuit A and circuit B can comprise or otherwise share the same processor which, in some example embodiments, can execute instructions stored, or otherwise accessed, via different areas of memory). Alternatively, or additionally, the one or more processors can be structured to perform or otherwise execute certain operations independent of one or more co-processors. In other example embodiments, two or more processors can be coupled via a bus to enable independent, parallel, pipelined, or multi-threaded instruction execution. Each processor can be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors can take the form of a single core processor, multi-core processor (e.g., a dual core processor, triple core processor, quad core processor, etc.), microprocessor, etc. In some embodiments, the one or more processors can be external to the apparatus, for example the one or more processors can be a remote processor (e.g., a cloud-based processor). Alternatively, or additionally, the one or more processors can be internal and/or local to the apparatus. In this regard, a given circuit or components thereof can be disposed locally (e.g., as part of a local server, a local computing system, etc.) or remotely (e.g., as part of a remote server such as a cloud-based server). To that end, processing circuitry in accordance with the present disclosure can include components that are distributed across one or more locations.

The present disclosure contemplates methods, systems and program products on any machine-readable media for accomplishing various operations. The embodiments of the present disclosure can be implemented using existing computer processors, or by a special purpose computer processor and/or controller for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general-purpose computer, special purpose computer, or special purpose processing machines to perform a certain function or group of functions.

Figure 2:
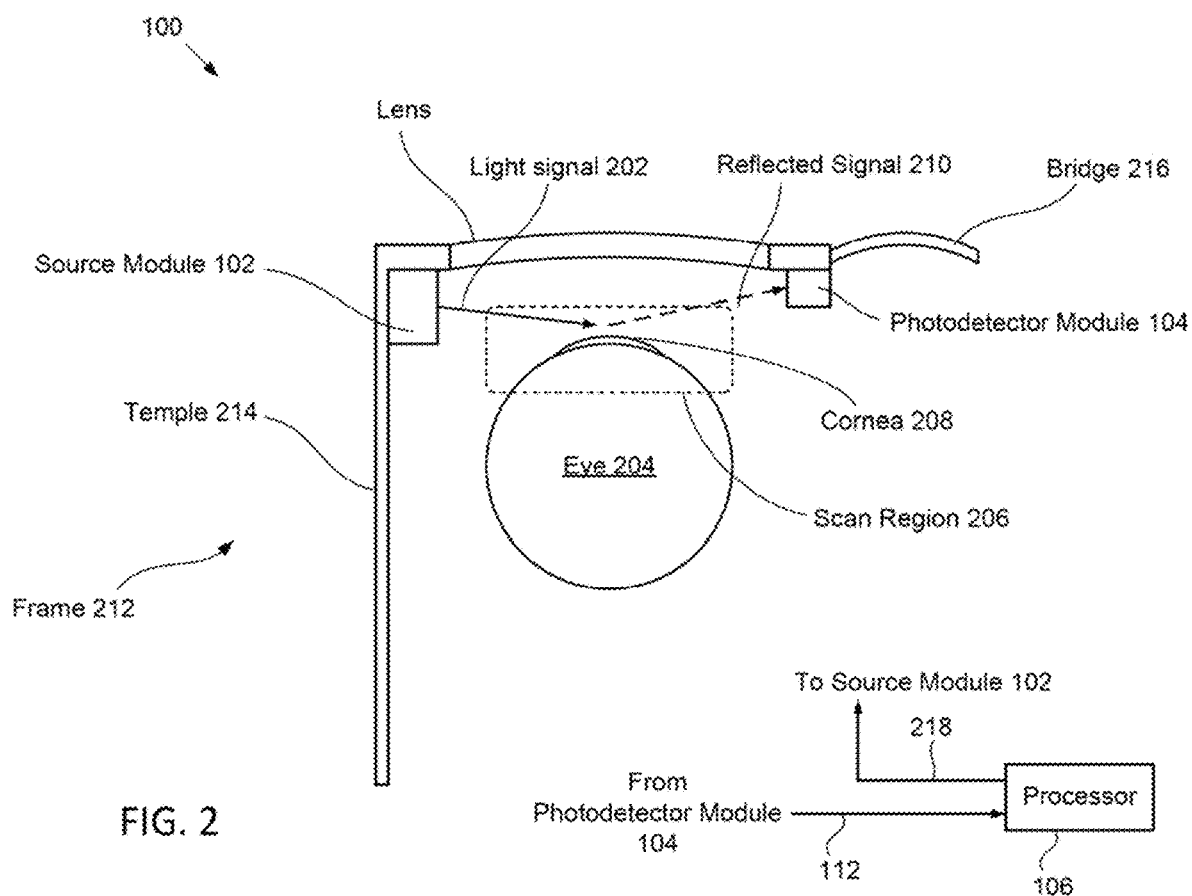
FIG. 2 depicts a schematic drawing of an exemplary operational eye-tracking geometry for system 100.

FIG. 2 depicts a schematic drawing of an exemplary operational eye-tracking geometry for system 100. Some eye-tracker system geometries according to aspects of the present disclosure include a MEMS scanner that sweeps a beam of light in a two-dimensional scan pattern over a region of an eye (typically the region containing the cornea) and a photodetector that receives light reflected from the region.

In the depicted example, source module 102 is mounted to temple 214 of eyeglass frame 212, while photodetector module 104 is mounted to the frame 212 near bridge 216.

Light source 108 emits light signal 202, which is steered by scanner 110 such that the light signal is scanned over scan region 206. In the depicted example, scan region 206 includes cornea 208; however, in some embodiments, a scan region includes a different surface feature of the eye.

The scan pattern generated by source module 102 is based on drive signals 218, which are provided by processor 106 to the rotation axes of scanner 110. As discussed below in more detail, each axis of scanner 110 is characterized by a resonant frequency and driven with a periodic signal having a drive frequency that is based on that resonant frequency. Those skilled in the art will appreciate that periodic drive signals provided to each axis of scanner 110 gives rise to a scan pattern that is substantially a Lissajous curve (also known as a Lissajous figure), which is the graph of a system of parametric equations defined by $x=A \sin(at+\delta)$; $y=B \sin(bt)$.

Optical energy of light signal 202 is reflected from the surface of cornea 208 at a glancing angle (~60 degrees to the normal) onto photodiode module 104 as reflected signal 210. As eye 204 rotates, the intensity of reflected signal 210 changes as a function of the position of a unique point on cornea 208, thereby enabling a system according to aspects of the present disclosure to track position of this point and, as a consequence, the position of the cornea. Notably, the surface area of the photodiode acts as a spatial filter to remove any high frequencies from the far-field pattern projected by the scanner.

Photodetector module 104 detects reflected signal 210 and provides corresponding output signal 112 to processor 106, which generates an estimate of the gaze vector of the eye based on the output signal.

Figure 3:
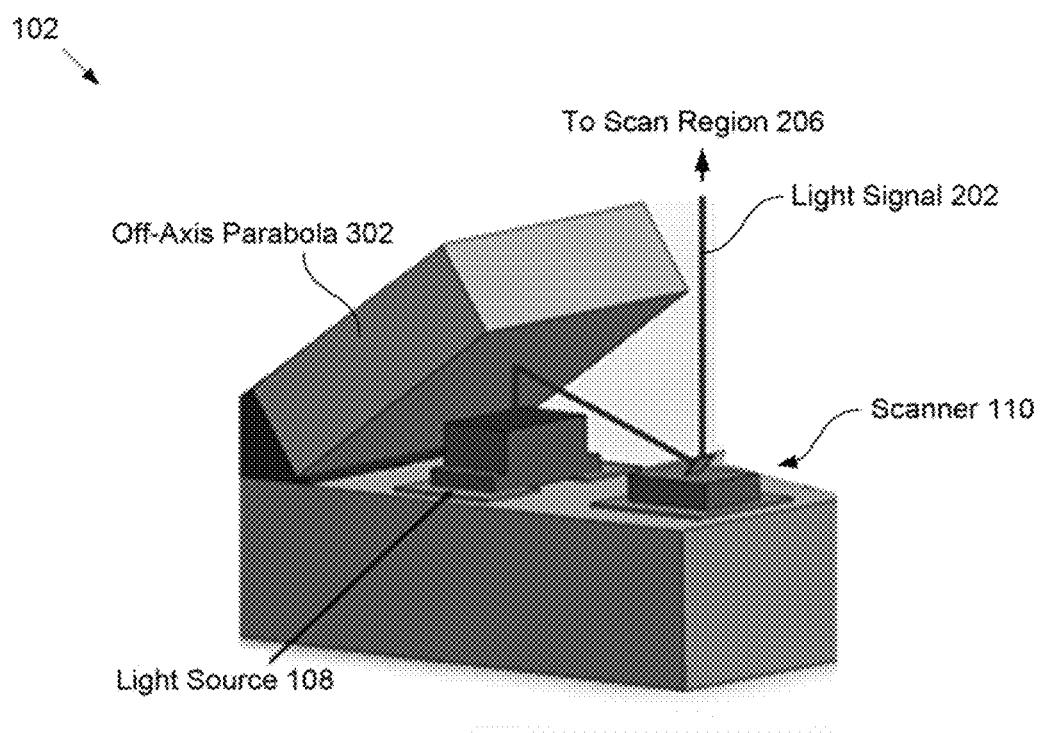
FIG. 3 depicts a schematic drawing of a perspective view of a source module in accordance with the present disclosure.

FIG. 3 depicts a schematic drawing of a perspective view of a source module in accordance with the present disclosure. Source module 102 includes comprises source 108, OAP 302, and scanner 110.

OAP 302 is a reflective lens that is configured to reduce the FWHM of light signal 112 and redirect it toward scanner 110 without significant loss. In some embodiments, OAP 302 is not included in source module 102. In some embodiments, source module 102 includes a flat mirror rather than an OAP.

Figure 4:
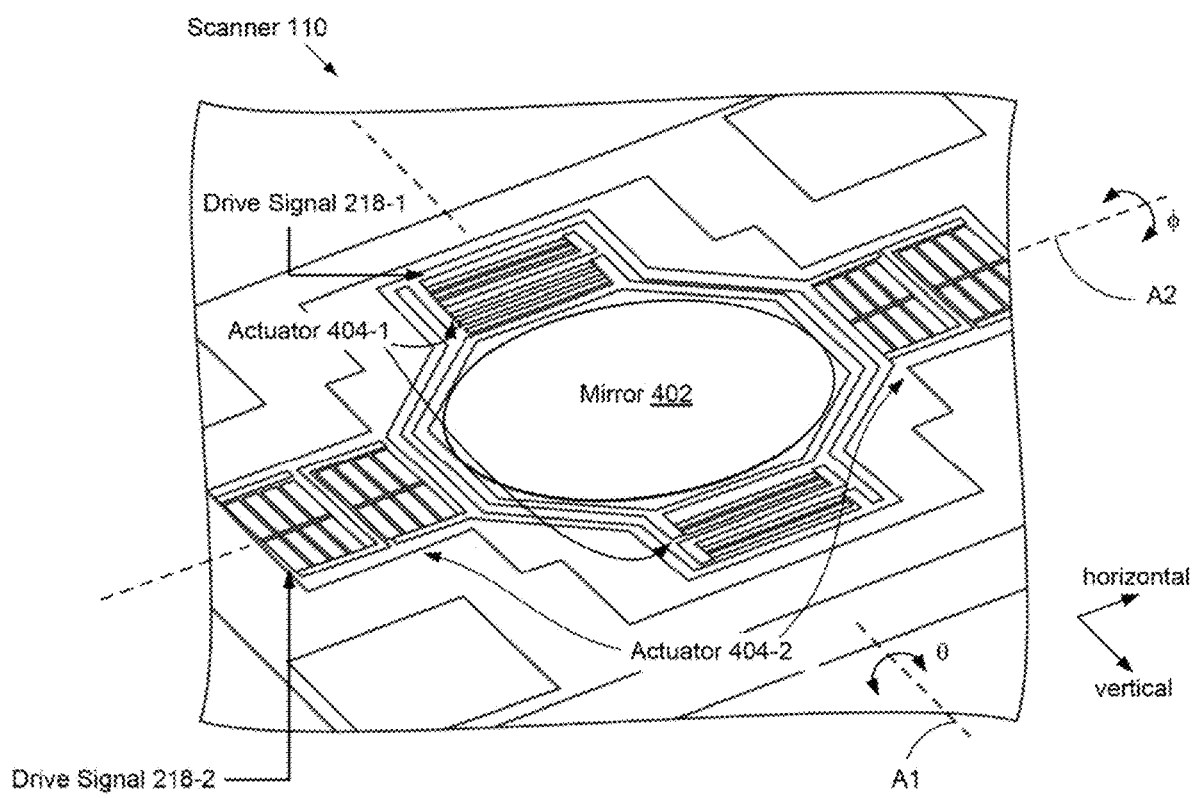
FIG. 4 depicts a photo-illustration of a scanner in accordance with illustrative eye tracking system 100.

FIG. 4 depicts a photo-illustration of a scanner in accordance with illustrative eye tracking system 100. Scanner 110 is a two-axis, resonant scanning mirror with two isothermal axes manufactured in in a CMOS process. When applied to such a device, CMOS-compatible voltages can generate 90° (mechanical) deflections in both axes. As may be observed from FIG. 4, the scanner geometry includes mirror 402 and actuators 404-1 and 404-2.

In the depicted example, mirror 402 is a substantially flat first-reflector surface formed on a structurally rigid plate that is operatively coupled with actuators 404-1 and 404-2 to enable its rotation about two orthogonal axes to steer light signal 202 in a desired pattern. Although the depicted example comprises a plane mirror, in some embodiments, scanner 110 includes a different optical element, such as a Fresnel zone plate as its optical element. As will be apparent to one skilled in the art, after reading this Specification, scanner 110 can include any suitable optical element for steering a light signal without departing from the scope of the present disclosure. Examples of alternative optical elements suitable for use in accordance with the present disclosure include, without limitation, other diffractive elements (e.g., holograms, Dammann gratings, etc.), refractive elements, lenses, and the like.

Each of actuators 404-1 and 404-2 comprises an opposed serpentine thermal-actuator pair that defines an axis of rotation and is configured to impart rotation about its respective rotation axis. Actuator 404-1 is configured to impart rotation θ about rotation axis A1 in response to drive signal 218-1 from processor 106, while actuator 404-2 is configured to impart rotation φ about rotation axis A2 in response to drive signal 218-2 from processor 106. In the depicted example, scanner 110 is configured such that actuator 404-1 scans light signal 202 in the horizontal scan direction and actuator 404-2 scans light signal 202 in the vertical scan direction.

The structure of actuator 404-1 defines resonant frequency $f_{R1}$ for rotation axis A1, while the structure of actuator 404-2 defines resonant frequency $f_{R2}$ for rotation axis A2.

Operationally, to rotate the scanner reflector, the temperature of one actuator is increased, while the opposed actuator's temperature is decreased proportionally, thereby operating isothermally. In some embodiments, actuators 404-1 and 404-2 are driven with a single pulse-width modulated (PWM) channel per axis, further simplifying its operation. In some embodiments, at least one actuator of a scanner is not an isothermal actuator. In some embodiments, at least one of actuators 404-1 and 404-2 comprises an actuator other than a thermal actuator, such as an electrostatic comb-drive actuator, parallel plate electrostatic actuator, piezoelectric actuator, electromagnetic actuator, and the like.

It should be noted that mirror 402 and actuators 404-1 and 402-2 are merely exemplary and a wide range of and/or CMOS-MEMS actuators can be used in scanner 110 without departing from the scope of the present disclosure. Examples of alternative scanning elements and rotary actuators suitable for use in accordance with the present disclosure are described in detail in, for example, U.S. Pat. Pub. Nos. 20180210547, 20150047078, 20160166146, and 20190204913, each of which is incorporated herein by reference.

As will be apparent to one skilled in the art, the scan pattern generated by a two-axis resonant system whose axes are driven at their respective (different) resonant frequencies can be modeled as a sinusoidal function of time in each of its axes—referred to as a Lissajous curve. Furthermore, one skilled in the art will recognize, after reading this Specification, that the shape and density of such a curve is determined primarily by the ratio between these resonant frequencies.

Figure 5:
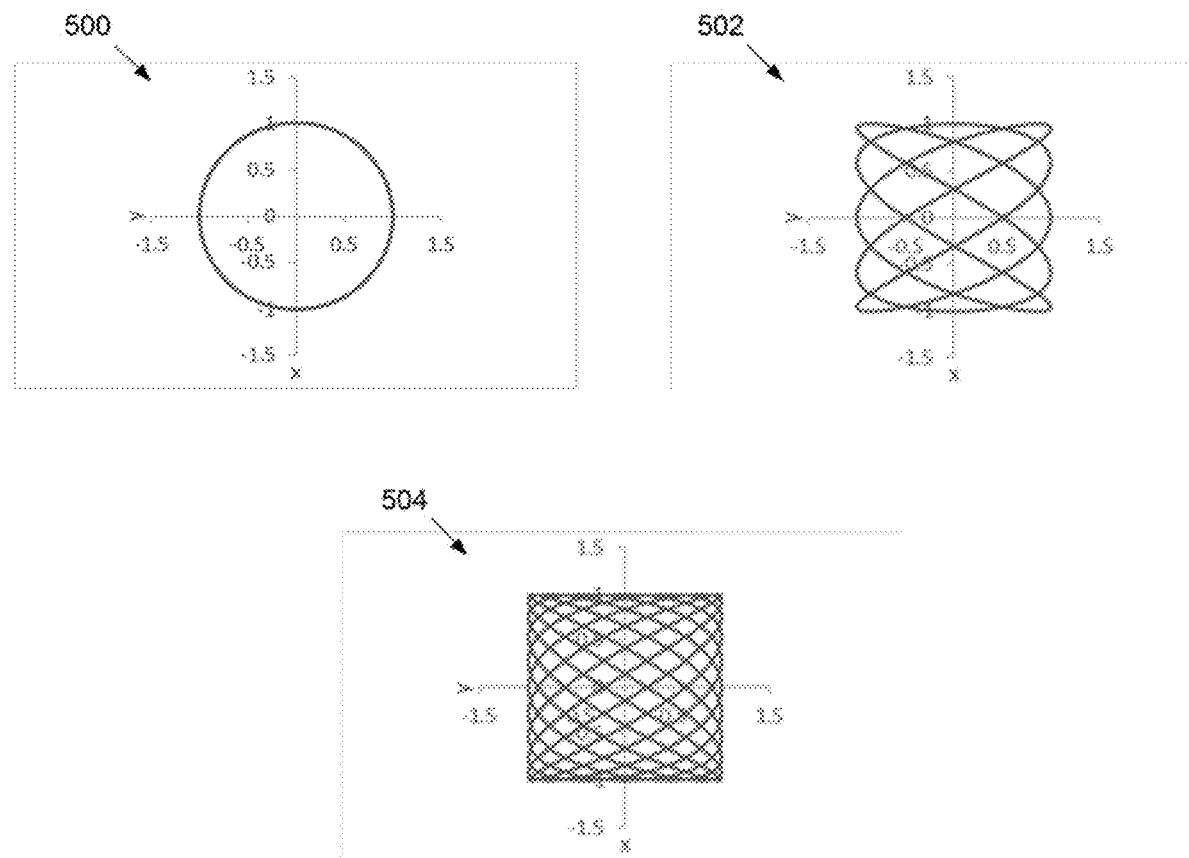
FIG. 5 depicts examples of Lissajous patterns generated by two-axis resonant scanners having different resonant frequency ratios.

FIG. 5 depicts examples of Lissajous patterns generated by two-axis resonant scanners having different resonant frequency ratios. Plots 500, 502, and 504 show Lissajous curves generated by scanner 110 driven on resonance using drive signals 218-1 and 218-2 whose drive frequencies have resonant frequency ratios of 1:1, 3:5, and 7:11, respectively, for multiple periods of the drive frequencies.

As would be apparent to one skilled in the art, each of the Lissajous curves depicted in FIG. 5 constitutes a plurality of paths, each path being traced during a different period (i.e., cycle) of the lower frequency of the pair of drive frequencies. As a result, many periods the drive signals are necessary to achieve a high-density pattern, such as that shown in plot 504. Unfortunately, many eye-tracking applications require a high-density scan pattern that is generated at a high rate so that eye movement can be tracked with low latency.

It should be noted that, since a Lissajous curve is defined via two periodic functions, a Lissajous pattern traced out over time (e.g., over many cycles of the drive frequencies) will also be periodic if, and only if, the ratio between the drive frequencies of drive signals 218-1 and 218-2 is a rational number.

Any Lissajous pattern of a given frequency ratio can be re-analyzed as being a precessing form of a different Lissajous pattern with a simpler rational frequency ratio. For example, a Lissajous pattern formed using a drive-frequency ratio of 800:401 is substantially a precessing form of a Lissajous pattern formed using a drive-frequency ratio of 2:1. However, the precession rate of such a pattern would normally be too slow for use in many applications. It is an aspect of the present disclosure, however, that suitable drive frequencies can be identified using methods analogous to that described below and with respect to FIGS. 6-9.

Figure 6:
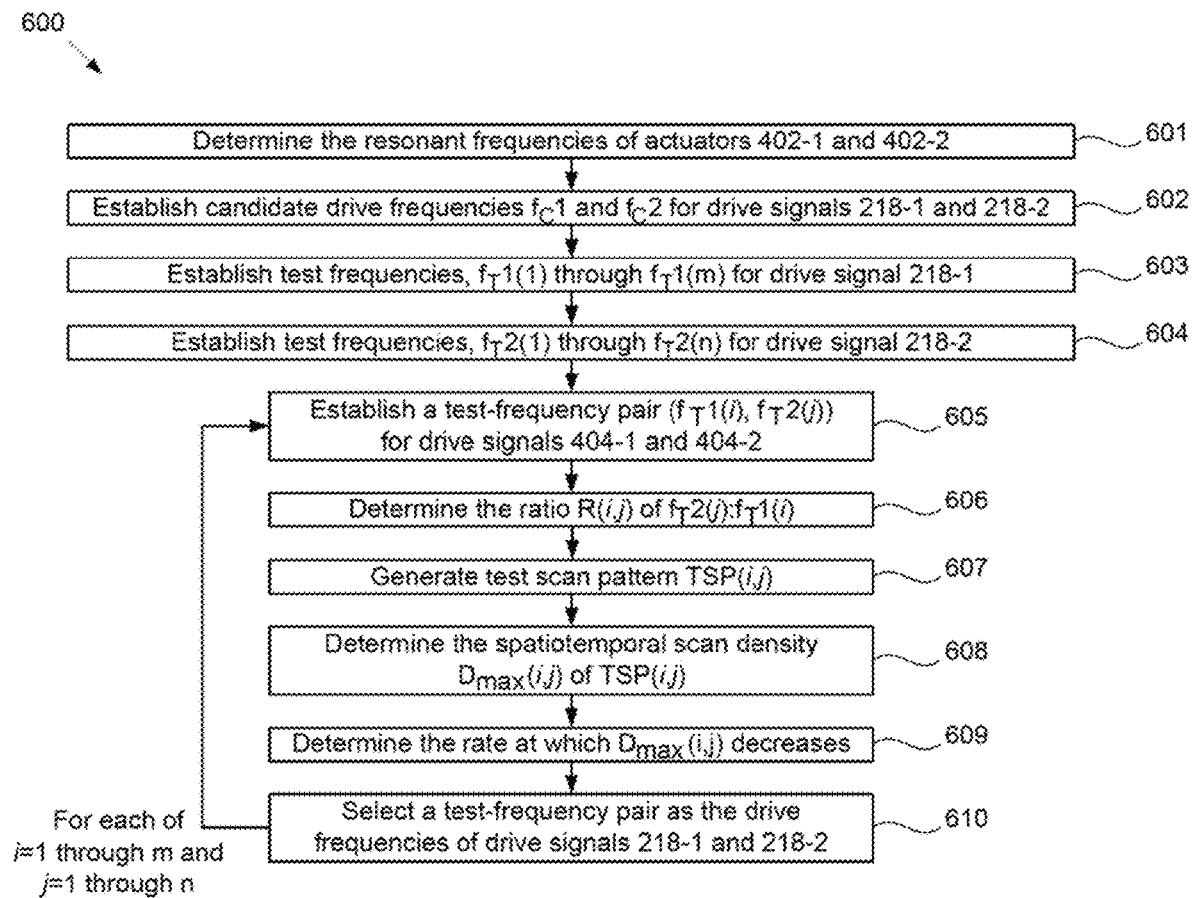
FIG. 6 depicts operations of a method suitable for achieving a scan pattern having high spatial density and low latency in accordance with the present disclosure.

FIG. 6 depicts operations of a method suitable for achieving a scan pattern having high spatial density and low latency in accordance with the present disclosure. Method 600 is described herein with reference to system 100 and continuing reference to FIGS. 1-4; however, methods in accordance with the present disclosure are suitable for use with a wide range of two-axis resonant scanning systems.

Method 600 begins with optional operation 601, wherein resonant frequencies $f_R1$ and $f_R2$ of axes A1 and A2, respectively, are determined. As will be apparent to one skilled in the art, the resonant frequencies of axes A1 and A2 are dictated by the structure of actuators 404-1 and 404-2. In some embodiments, $f_R1$ and $f_R2$ are measured experimentally. For example, in the depicted embodiment, a "ring-down" measurement is performed to determine the resonant frequency of each of axes A1 and A2. In some embodiments, processor 106 includes circuitry for determining the resonance frequencies of the axes via an "in-system" ring-down procedure. In some embodiments, $f_R1$ and $f_R2$ are estimated based on the physical design of actuators 404-1 and 404-2.

At operation 602, candidate frequencies $f_c1$ and $f_c2$ are established for axes A1 and A2, respectively. In the depicted example, candidate frequencies $f_c1$ and $f_c2$ are established by adding frequency offset FO1 to resonant frequency $f_R1$ and frequency offset FO2 to resonant frequency $f_R2$.

At operation 603, a set of first test frequencies $f_T1(1)$ through $f_T1(m)$ is established, where each first test frequency $f_T1(i)$ (for i=1 through m) is a frequency within a first frequency range, FR1, around candidate frequency $f_C1$ such that the candidate frequency is within the first frequency range.

At operation 604, a set of second test frequencies $f_T2(1)$ through $f_T2(n)$ is established, where each second test frequency $f_T2(j)$ (where j=1 through n) is a frequency within a second frequency range, FR2, around candidate frequency $f_C2$ such that the candidate frequency is within the second frequency range. In some embodiments, at least one set of test frequencies includes the resonant frequency and/or candidate frequency to which it corresponds.

In some embodiments, at least one of the sets of first and second test frequencies is generated based, in part, on other system parameters, such as the structure of the electronics used to drive an actuator, one or more reference clocks, capabilities of circuits included in processor 106 (e.g., phase-lock loops, timers, etc.), and the like.

Figure 7:
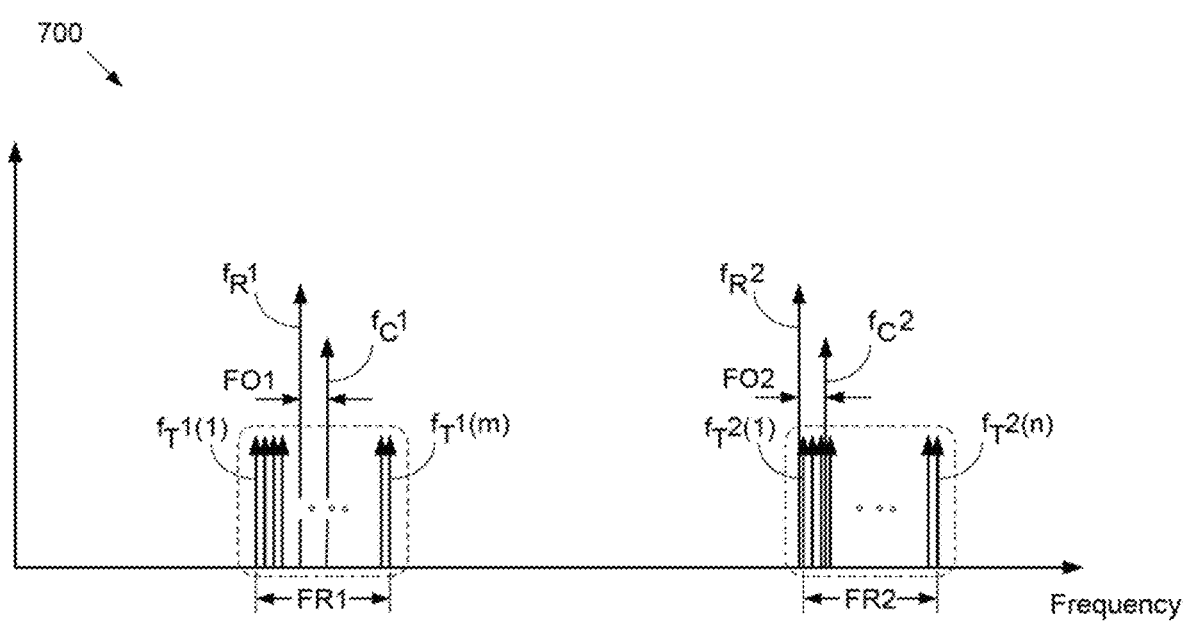
FIG. 7 depicts plots showing representative sets of test frequencies for driving axes A1 and A2 in accordance with the present disclosure.

FIG. 7 depicts plots showing representative sets of test frequencies for driving axes A1 and A2 in accordance with the present disclosure. Plot 700 shows exemplary frequency components for the resonant frequencies, candidate frequencies, and sets of test frequencies for identifying desired drive frequencies for drive signals 218-1 and 218-2.

For each of i=1 through m and j=1 through n:

At operation 605, establish test-frequency pair ($f_T1(i)$, $f_T2(j)$) for drive signals 218-1 and 218-2.

At operation 606 determine the ratio, R(i,j), of the second test frequency to the first test frequency test-frequency pair ($f_T1(i)$, $f_T2(j)$), where R(i,j) is $f_T2(j):f_T1(i)$.

At optional operation 607 generate a test scan pattern TSP(i,j) using test-frequency pair ($f_T1(i)$, $f_T2(j)$) as drive signals 218-1 and 218-2, respectively. In some embodiments, test scan pattern TSP(i,j) is generated by plotting it in phase space [$\psi_1(i)$, $\psi_2(j)$], for a plurality, P, of cycles (i.e., periods) of drive signal 218-1, where 104 $_1(i)$ is the phase of test frequency $f_T1(i)$ and $\psi_2(j)$ is the phase of test frequency $f_T2(j)$.

Figure 8A:
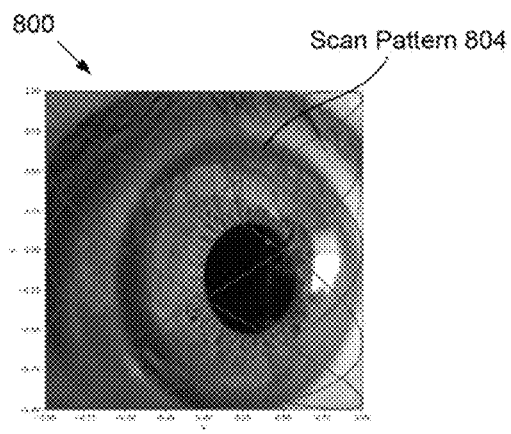
FIGS. 8A-B depict a representative Lissajous pattern plotted in scan space and phase space, respectively.
Figure 8B:
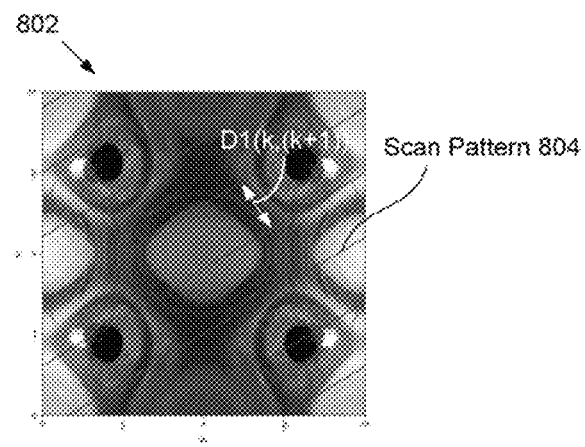

FIGS. 8A-B depict a representative Lissajous pattern plotted in scan space and phase space, respectively. Plots 800 and 802 show a Lissajous scan overlaying an image of scan region 206, where the Lissajous scan is generated with drive signals 218-1 and 218-2 having a frequency ratio of 3:5.

Plots 800 and 802 show Lissajous pattern 804 overlaying an image of a scan region, where the pattern and scan region are plotted in scan space and phase space, respectively.

As seen from plot 800, Lissajous pattern 804 is highly complex when plotted in scan space; however, it is highly regular when plotted in phase space. In addition, when plotted in phase space, the Lissajous pattern forms a series of parallel lines, which, as they reach one side of plot 802, wrap around to the other side. It should be noted that the slope of the parallel lines that manifest in phase space is directly related to the frequency ratio.

Figure 9A:
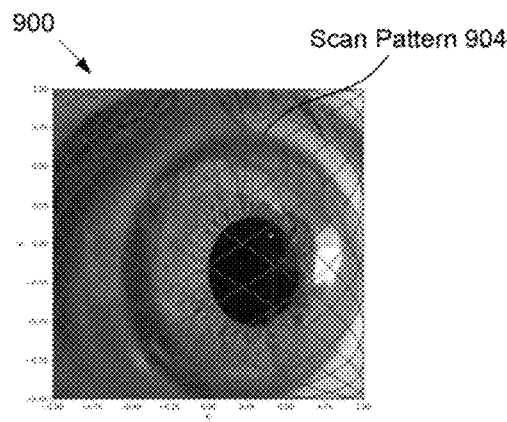
FIGS. 9A-B depict a representative Lissajous pattern plotted in scan space and phase space, respectively, where the Lissajous pattern is generated using drive signal having a frequency ratio of 7:11.
Figure 9B:
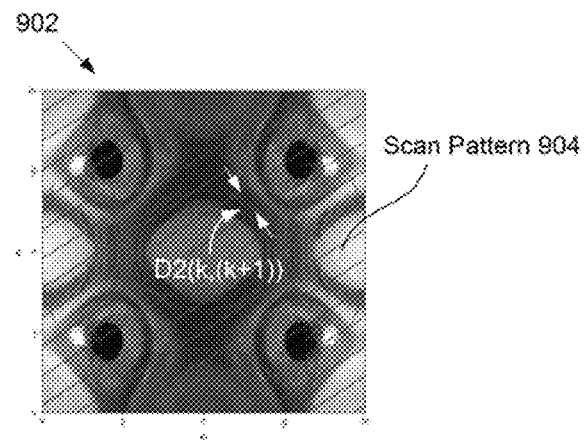

FIGS. 9A-B depict a representative Lissajous pattern plotted in scan space and phase space, respectively, where the Lissajous pattern is generated using drive signal having a frequency ratio of 7:11.

Plots 900 and 902 show a Lissajous scan overlaying an image of scan region 206, plotted in scan space and phase space, respectively, where the Lissajous scan is generated with drive signals 218-1 and 218-2 having a frequency ratio of 7:11.

For any pair of test frequencies $f_T1(i)$ and $f_T2(j)$, the relationship between their respective phases $\psi_1(i)$ and $\psi_2(j)$ at any time, t, is given by the modulo equation:

$$\psi_2(j,t) = R(i,j)\psi_1(i,t) (\mod 2\pi),$$

which can be evaluated at every full cycle of $f_T1(i)$ resonance (i.e., when $\psi_1(i)$ is an integer multiple, p, of $2\pi$) as:

$$\psi_2[p] = 2\pi R(i,j)p (\mod 2\pi).$$

Returning to method 600, at operation 608, the spatiotemporal scan density, SD(i,j) for test scan pattern TSP(i,j) is determined. In some embodiments, the scan density of test scan pattern TSP(i,j) is defined as the largest modulo $2\pi$ distance, $D_{max}(i,j)$, among pairs of scan lines adjacent in space, for a given finite sampling time.

It should be noted that is possible to recursively compute $D_{max}(i,j)$. As a result, in some embodiments, it is not necessary to actually generate a plot of a scan pattern in phase space to determine it and operation 607 is optional.

For example, the distance, $D_\uparrow$, between the first scan line at t=0 and the closest scan line above it after k periods, for $f_T1(i)$ and $f_T2(j)$, can be expressed recursively as (temporarily neglecting the (i,j) notation for clarity):

$$D_\uparrow[0] = 2\pi$$

$$D_\uparrow[k] = \min(D_\uparrow[k-1], \mod(\psi_2[k], 2\pi)) =$$

$$\min(D_\uparrow[k-1], \mod(2\pi Rk, 2\pi)) = \min(D_\uparrow[k-1], 2\pi \mod(Rk, 1)),$$

while the distance, $D_\downarrow$, between the first scan line and the adjacent scan line below it after k periods, can be expressed recursively as:

$$D_\downarrow[0] = 2\pi$$

$$D_\downarrow[k] = \min(D_\downarrow[k-1], \mod(-\psi_2[k], 2\pi)) =$$

$$\min(D_\downarrow[k-1], \mod(-2\pi Rk, 2\pi)) = \min(D_\downarrow[k-1], 2\pi \mod(-Rk, 1)),$$

where the maximum gap size for test scan pattern TSP(i,j) at a given scan cycle, k, is simply the maximum of the two single-sided gap sizes:

$$D_{max}(i,j)[k] = \max(D_\uparrow[k], D_\downarrow[k]),$$

where $D_{max}[k]$ represents the spatiotemporal density of TSP(i,j), since it describes how dense the scan is after each iteration, k, of a period of test drive frequency fT1(i).

At operation 609, the rate at which $D_{max}(i,j)$ shrinks over time is determined. In some embodiments, this rate is determined by identifying a baseline value that $D_{max}(i,j)$ approaches after some number of drive-frequency cycles, and the number of cycles required to reach this baseline value.

Figure 10:
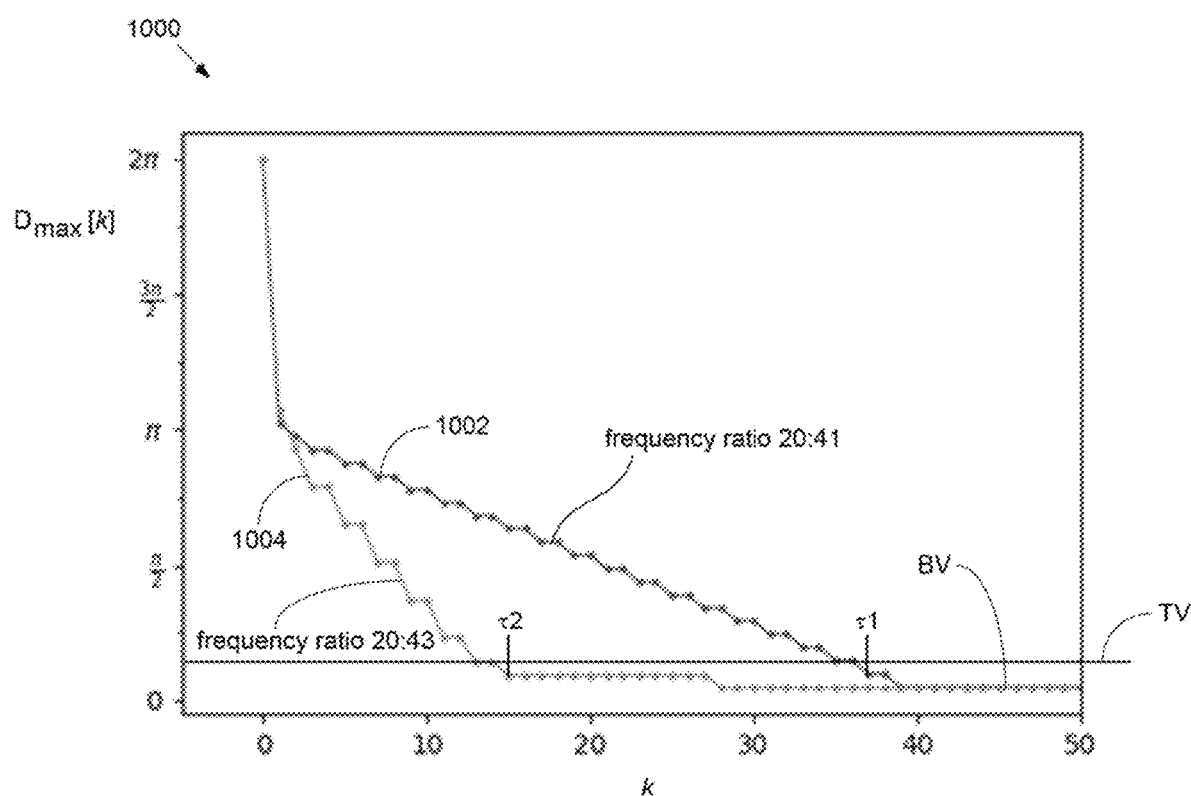
FIG. 10 depicts a plot of $D_{max}(i,j)[k]$ versus the number of drive-signal cycles, k, for a drive signal used to generate scan patterns generated using two different sets of test frequencies.

FIG. 10 depicts a plot of $D_{max}(i,j)[k]$ versus the number of drive-signal cycles, k, for a drive signal used to generate scan patterns generated using two different sets of test frequencies. Plot 1000 includes traces 1002 and 1004, which show the progression of the value of $D_{max}(i,j)$ over successive periods of drive signal 218-1 for test frequencies having 20:41 and 20:43 ratios, respectively. In some embodiments, the value of $D_{max}(i,j)$ is plotted over successive periods of drive signal 218-2.

Each of traces 1002 and 1004 are characterized by the same baseline value BV, which is equal to approximately $\pi/16$ in the depicted example. However, the conversion time, $\tau 2$, for the test-frequency pair having a ration of 20:43 (i.e., trace 1004) is significantly shorter than the conversion time, $\tau 1$, for the test-frequency pair having a ration of 20:41 (i.e., trace 1002). For the purposes of this Specification, including the appended claims, "conversion time" is defined as the time required for the largest modulo $2\pi$ distance of a scan pattern to reach a value that differs from its baseline value by less than a desired offset. In the depicted example, the desired offset is equal to $\pi/25$; however, any offset value can be used without departing from the scope of the present disclosure.

Specifically, plot 1000 shows that the drive-frequency ratio of 20:43 approaches baseline value BV in only 14 cycles of its test drive frequency $f_T1$, reaching this baseline value in only 28 cycles. In contrast, the drive-frequency ratio of 20:41 requires 38 cycles of its $f_T1$ to approach BV and 39 cycles to reach its base value. Alternatively, in some embodiments, threshold value TV is used as a metric in place of baseline value BV, where TV is a user-defined value for any of a wide range of eye-tracker system attributes. This is particularly advantageous when different drive-frequency ratios are characterized by different baseline values. In the depicted example, threshold value TV for a minimum acceptable spatial density for eye-tracking system 100.

In some embodiments, the suitability of a test-frequency pair is evaluated by determining the area under the trace of $D_{max}(i,j)$ versus successive periods of one of drive signals 218-1 and 218-2. For example, in plot 1000, the area under trace 1004 is smaller than the area under trace 1002;

therefore, its drive-frequency ratio would typically be considered preferable to that used to generate trace 1002.

At operation 610, a test-frequency pair of the set of test-frequency pairs is selected as the drive frequencies of drive signals 218-1 and 218-2 based on at least one of:
  i. the values determined for spatiotemporal scan densities SD(1,1) through SD(m,n); or
  ii. the values of τ(1,1) through τ(m,n); or
  iii. a plurality of data rates defined by the time for each of spatiotemporal scan densities SD(1,1) through SD(m,n) to become smaller than a user-selected feature size; or
  iv. a plurality of data rates defined by the time for each of spatiotemporal scan densities SD(1,1) through SD(m,n) to become smaller than a user-selected threshold value; or
  v. the values determined for spatiotemporal scan densities SD(1,1) through SD(m,n) relative to a user-selected value for $D_{max}$; or
  vi. the rate at which each of $D_{max}$(1,1) through $D_{max}$(m,n) shrinks; or
  vii. the area under the curve of a plot of $D_{max}$ versus cycles of one of test drive frequencies $f_T1$ and $f_T2$;
  viii. any combination of i, ii, iii, iv, v, vi, and vii.

Although method 600 includes a specific order of method steps, the order of the steps can differ from what is disclosed. Also, two or more steps can be performed concurrently or with partial concurrence. Such variation will depend on the software and hardware systems chosen and on designer choice, among other factors. All such variations are within the scope of the disclosure. Likewise, software implementations could be accomplished with standard programming techniques with rule-based logic and other logic to accomplish the various connection steps, calculation steps, processing steps, comparison steps, and decision steps.

As noted briefly above, in some embodiments, photodetector module 202 includes a non-imaging plurality of photodetectors that is configured such that each photodetector can detect light reflected from scan region 206. Such an arrangement is particularly advantageous, for example, when reflected signal 210 is diffuse.

Figure 11:
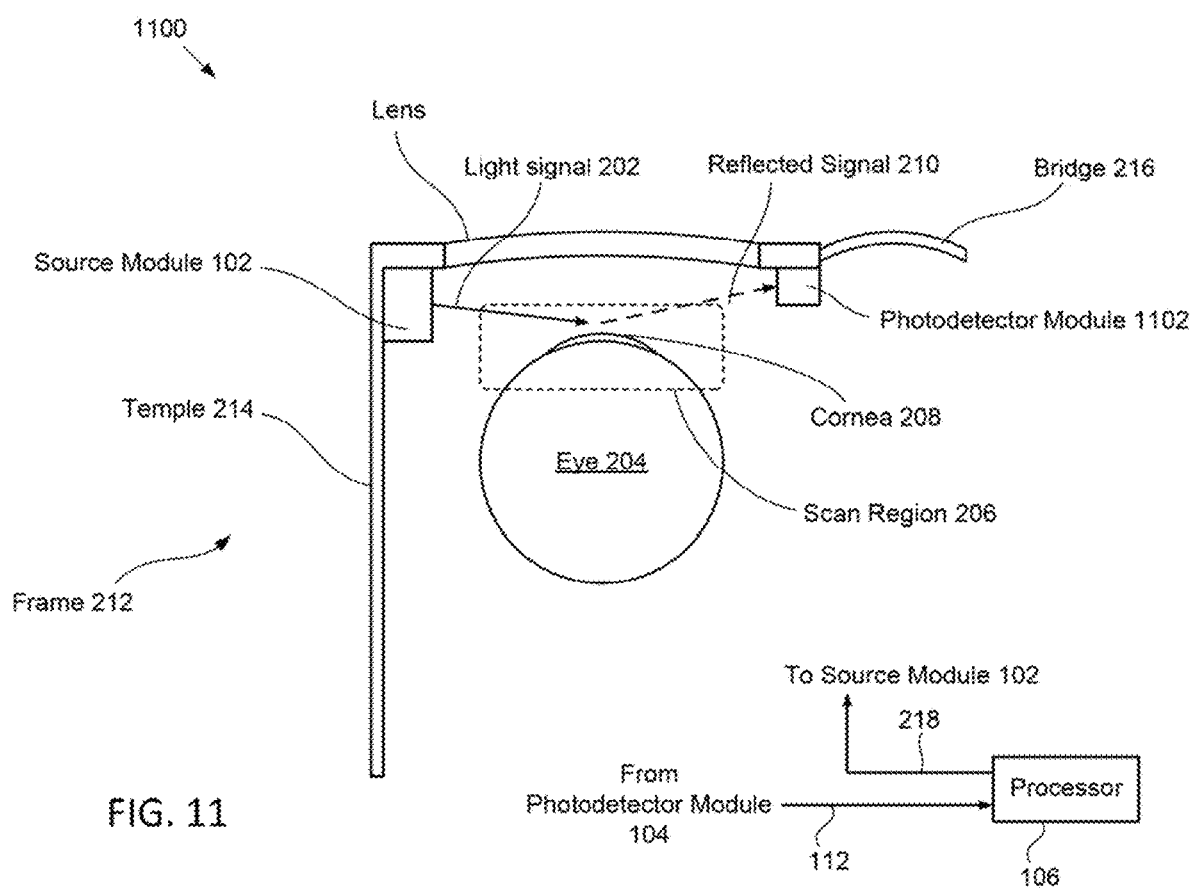
FIG. 11 depicts a schematic drawing of an alternative operational eye-tracking geometry in accordance with the present disclosure.

FIG. 11 depicts a schematic drawing of an alternative operational eye-tracking geometry in accordance with the present disclosure. System 1100 is analogous to system 100; however, system 1100 includes photodetector module 1102, which comprises five photodetectors arranged such that each photodetector can detect light reflected from scan region 206. It should be noted that the plurality of photodetectors does not collectively image scan region 206 since each is a non-imaging photodetector and no wavefront information is contained in their output signals. Although the depicted example includes a photodetector module having five photodetectors, any practical number of photodetectors can be included in photodetector module 1102 without departing from the scope of the present disclosure.

In the depicted example, photodetector module 1102 includes at least one photodetector having a gain configuration sufficient to enable it to detect a diffuse reflection from scan region 206 having a relatively lower level of light and still trigger a rising edge in its output signal. As light signal 202 traverses an iris-to-pupil edge, the diffuse reflection vanishes and may produce a falling edge. In practice, the polarity of the edges may be reversed, such that the pupil region represents the "high" state of the photodiode output, while the iris region represents the "low" state of the photodetector output.

Figure 12:
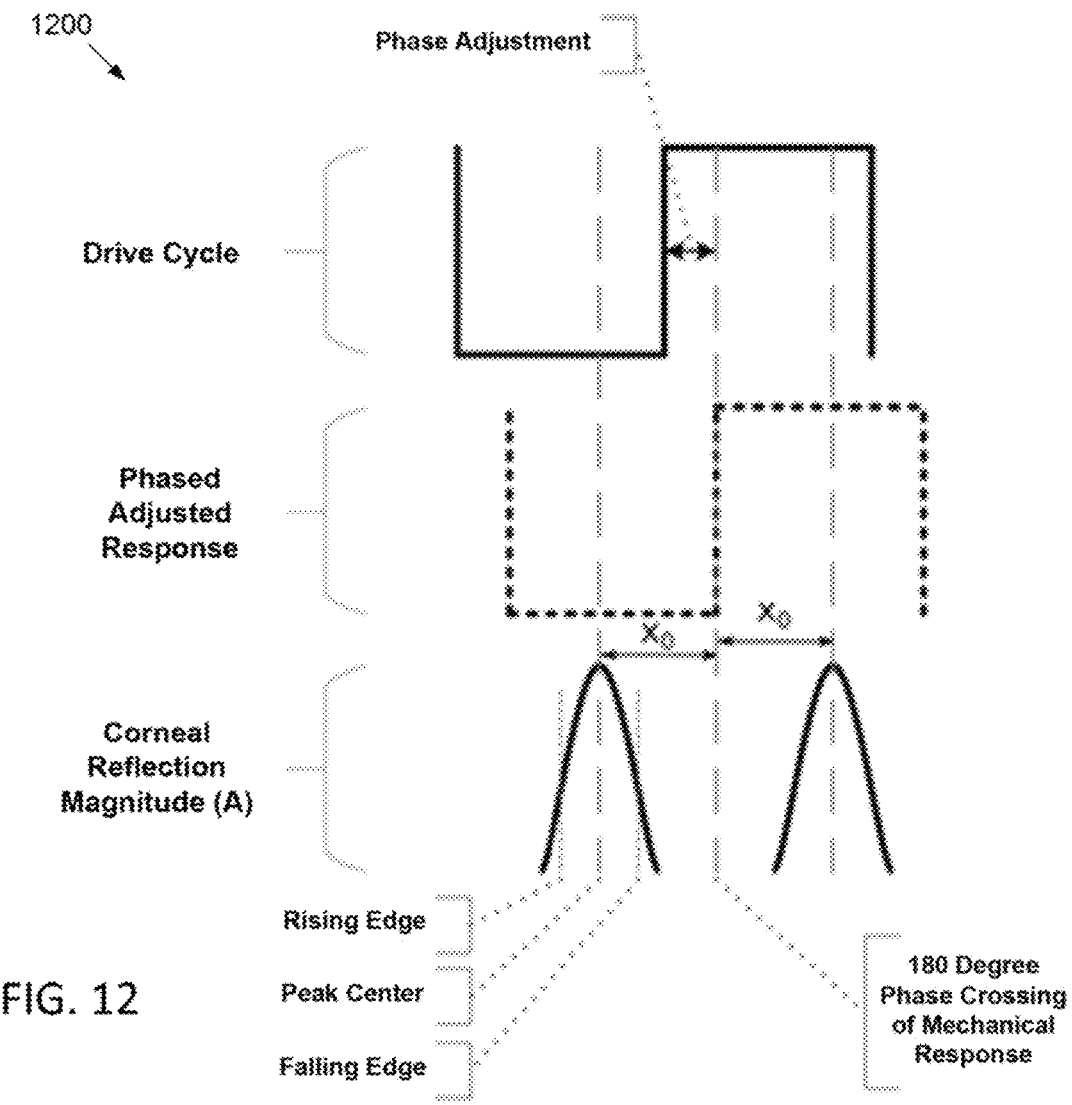
FIG. 12 depicts a series of timing diagram plots illustrating scanning in phase lock/resonance based optical feedback according to aspects of the present disclosure.

FIG. 12 depicts a series of timing diagram plots illustrating scanning in phase lock/resonance based optical feedback according to aspects of the present disclosure.

Plot 1200 shows the timing of the pulses produced by the plurality of photodetectors in photodetector module 1102 with respect to the drive signal to the MEMS device. Because of a second-order transfer function of the MEMS device, a phase shift exists between drive signals 218-1 and 218-2 and the mechanical position of the device. This phase offset must be considered in order to correlate timing of photodiode pulses with the angle of the MEMS device.

If the eye is stationary, the pulses captured by the system while the beam sweeps in forwards and backwards in the horizontal direction will be symmetric with respect to a first line of symmetry that represents the phase offset of the horizontal actuator (e.g., actuator 404-1) at, or near, its resonant frequency. Additional phase delay may be produced by the thermal time constant of the actuators, which may be electrothermal devices. Similarly, as the beam sweeps upwards and downwards in the vertical direction, a second line of symmetry representing the phase offset of the vertical actuator (e.g., actuator 404-2) will arise. Because the actuators are orthogonal, the vertical and horizontal phase offsets can be calculated independently.

In some embodiments, the phase offset for at least one of the vertical and horizontal axes is calculated by autoconvolution, in which the corneal reflection magnitude (e.g., as shown in FIG. 12) is convolved with itself. The output of such an autoconvolution will typically contain a maximum at the line of symmetry, revealing the phase offset. It should be noted that autoconvolution can be performed independently for each of the vertical and horizontal axes.

In some embodiments, in 2 dimensions, a circular convolution of the phase space representations (e.g., as shown in FIGS. 8B and 9B) would reveal lines of symmetry for each of the vertical and horizontal axes.

It should be noted that such operations can be used in any embodiment in accordance with the present disclosure to calculate the phase offsets of scanner 110 without requiring integrated position sensors.

Figure 13:
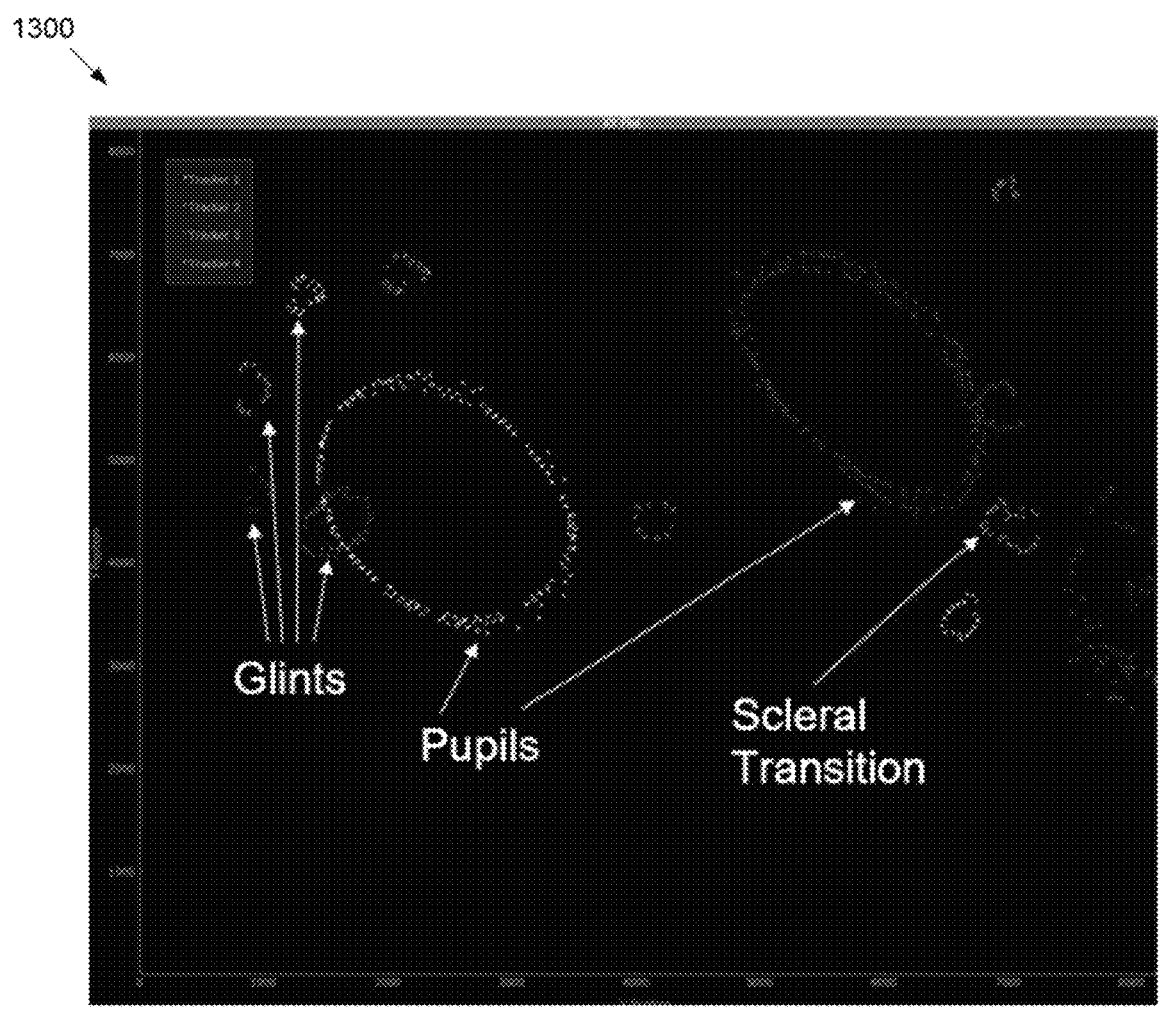
FIG. 13 depicts a plot of the detected pulses from photodetector module 1102.

FIG. 13 depicts a plot of the detected pulses from photodetector module 1102. Plot 1300 includes output signals from each photodetector in the photodetector module. With the phase offsets calculated and drive frequencies selected to substantially optimize the surface area coverage of scan region 206, the output signals collectively define a point cloud that reveals five corneal glint contours and one pupil outline per eye. It should be noted that a glint may appear to stretch out as it transitions from the corneal region to a scleral region upon rotation of the eye, after which it may no longer be present. Furthermore, it is important to note that, like system 100, system 1100 is a "non-imaging" system since no wavefront information is contained in any of the outputs of the photodetectors of photodetector module 1102; therefore, no image processing algorithms or streaming video from a camera are required to capture these point clouds at high data rates.

The positions of pulses that form contours of glints may be further processed to calculate the centroid position of the glints. A common centroid calculation may be performed, but this technique may not be as efficient as other methods based on the geometry of the glint data. For example, the perpendicular bisector of at least 2 chords of the glint circle may be used to capture the center position with fewer datapoints, resulting in lower latency and higher bandwidth.

Figure 14:
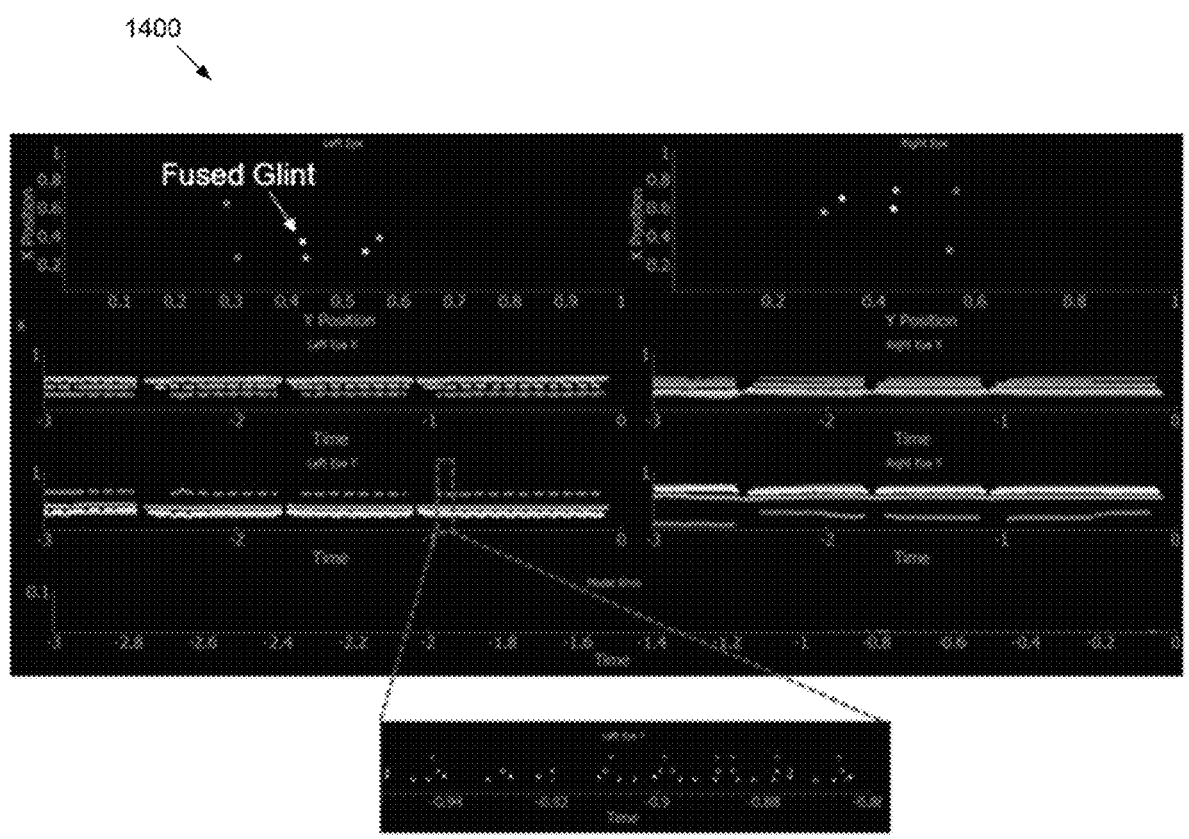
FIG. 14 shows a representation of the corneal glints as single points, as well as time series data corresponding to the pulses.

FIG. 14 shows a representation of the corneal glints as single points, as well as time series data corresponding to the pulses. Plot 1400 is generated using the operations described above and with respect to FIG. 13 on the raw point cloud data. In addition, multiple glints are used to compute the position of a "fused" glint, which may be calculated based on some knowledge of the photodetector placement within the eye tracking system. The fused glint position is estimated from however many glints are present for a given eye angle (at least 2), thereby improving the robustness of the system.

Figure 15:
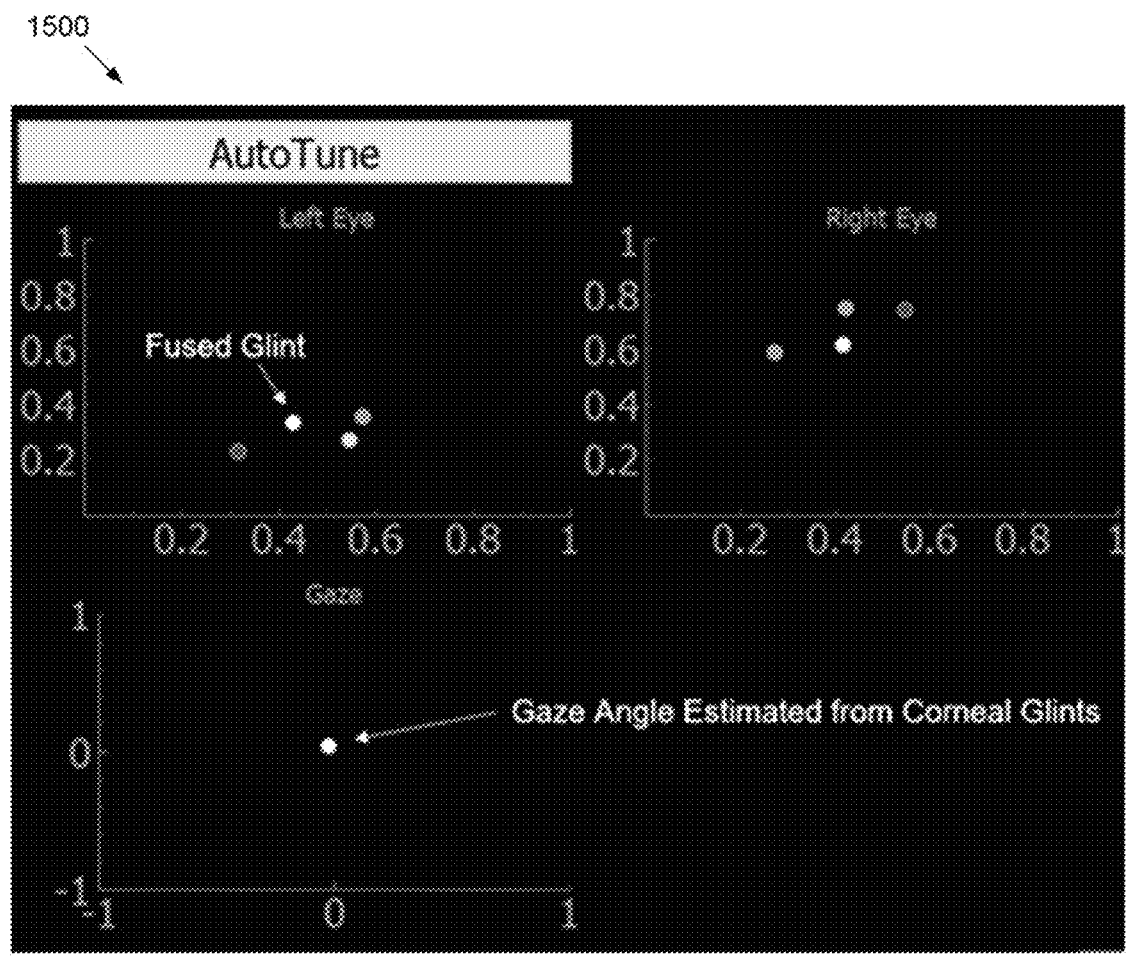
FIG. 15 depicts estimation of a gaze angle based on fused glint positions.

FIG. 15 depicts estimation of a gaze angle based on fused glint positions. Plot 1500 is representative of an estimate generated after a calibration is performed, which relates real-world gaze angles to glint positions. It should be noted that small changes in the system geometry (e.g. from glasses shifting on a user's face) can give rise to large deviations in the estimated gaze angle.

Figure 16:
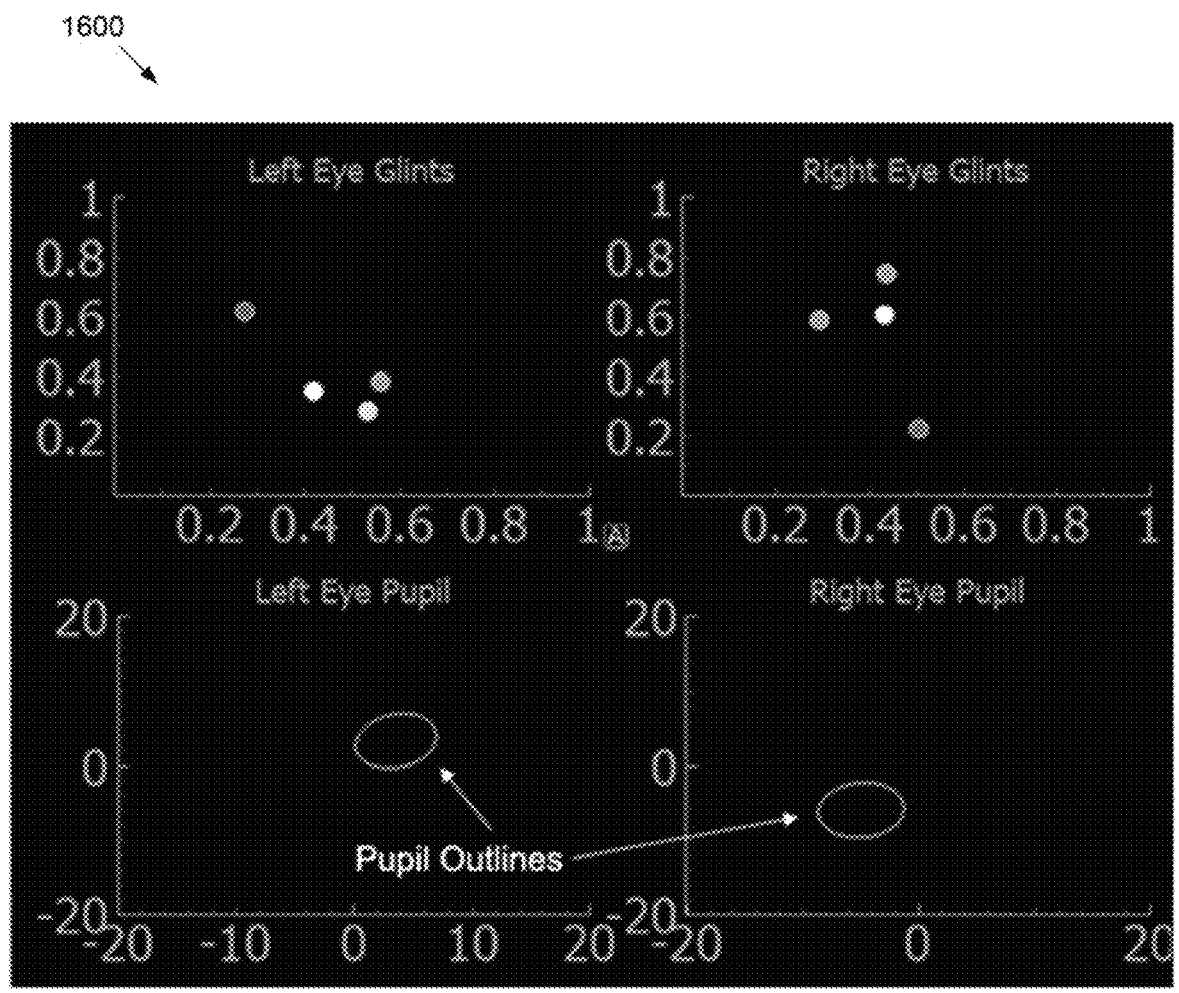
FIG. 16 depicts pupil information and related glint information obtained in accordance with the present disclosure.

FIG. 16 depicts pupil information and related glint information obtained in accordance with the present disclosure. Plot 1600 shows pupil shapes extracted from point clouds while rejecting noise via the operations described above.

It is an aspect of the present disclosure that the availability of both pupil and glint information enables slip-invariant eye tracking, which can be achieved via any of a range of suitable techniques, such as pupil-center corneal reflection (PCCR) methods. In PCCR, a vector from the pupil center to the fused glint is captured, and calibration of this vector to real-world gaze angles is performed by a given user (one-time calibration). Subsequent sessions may re-use this calibration for convenience and ease-of-use.

It is a further aspect of the present disclosure that a calibrated and slip invariant eye tracker can function as a human-computer-interface device. When considering the design of such an interface, it is important to suppress unintentional eye movements which occur constantly as a user explores their visual field. It is also important to minimize eye strain through the use of intuitive eye-based gestures that do not require a user to constrain their gaze to signal inputs.

Figure 17:
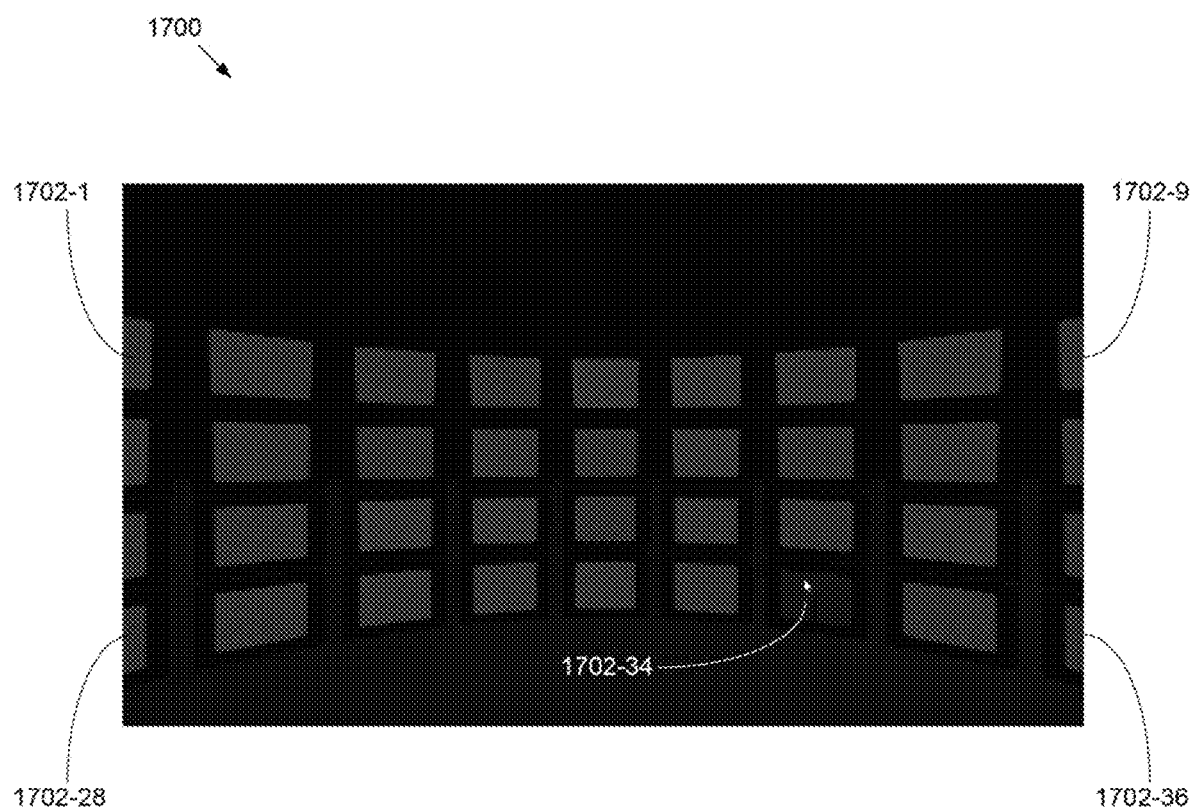
FIG. 17 depicts an example of an eye-tracker-based human-computer-interface in accordance with the present disclosure.

FIG. 17 depicts an example of an eye-tracker-based human-computer-interface in accordance with the present disclosure. Display 1700 includes a video displays 1702-1 through 1702-36, which are arranged in a 4×9 array. System 1200 is employed as a human-computer-interface that determines the gaze direction of a user, which, in this example, is directed at display 1702-34. As a result, all of the televisions are put in an "off" mode except for display 1702-34. In other words, each of video displays 1702-1 through 1702-36 is "selected" or "unselected" based upon the gaze direction of the user as determined by system 1200.

As will be apparent to one skilled in the art, eye-tracking systems in accordance with the present disclosure can be used as a human-computer-interface in myriad ways. In some embodiments, system 1200 can be used to navigate a menu by, for example:

- blinking to start a navigation application; or
- scrolling icons along a display by looking towards one side of the navigation pane; or
- stopping icon scroll by pursuing an icon; or
- double blinking to select the icon of interest; or
- any combination of the above.

Scrolling objects, which are extensively used in applications on mobile handsets and smart glasses due to their limited screen real-estate, often trigger the Optokinetic Reflex (OKR), which is characterized by a series of alternating smooth pursuit and saccade eye movements.

Embodiments in accordance with the present disclosure are capable of extremely high rates of eye tracking because no image processing is required. As a result, they are able to derive knowledge of the dynamics of eye movements and the durations of smooth pursuit movements, which can be used to detect a user's level of interest in scrolling content. As a result, the user may effortlessly decelerate scrolling objects to land on an object of interest. Although the use of blinks as an input gesture may result in false positives, the high sampling rate attainable through the teachings provided herein can be used to set timing thresholds to disambiguate involuntary blinks, which have consistent durations that relate to a user's state (e.g. fatigue) from intentional blinks.

Figure 18:
FIG. 18 depicts another eye-tracking-based user interface example in accordance with the present disclosure.

FIG. 18 depicts another eye-tracking-based user interface example in accordance with the present disclosure. Plot 1800 is a representation of a fruit slicing application in which, when a user looks towards an object to be sliced, the direction of the user's saccade is used to slice all objects along the saccade vector.

In some embodiments, the slicing vector extends beyond the fixation of the user by an amount that may be set by the peak velocity of the saccade, by the reaction time of the user to the presence of the object, or by some other means. Since the use of a saccade without any means of confirming intent can give rise to false positives, in some embodiments, a separate input mechanism (e.g. keystroke, mouse click, head gesture as measured by an inertial measurement unit (IMU), etc.) is used to trigger an action.

Figure 19:
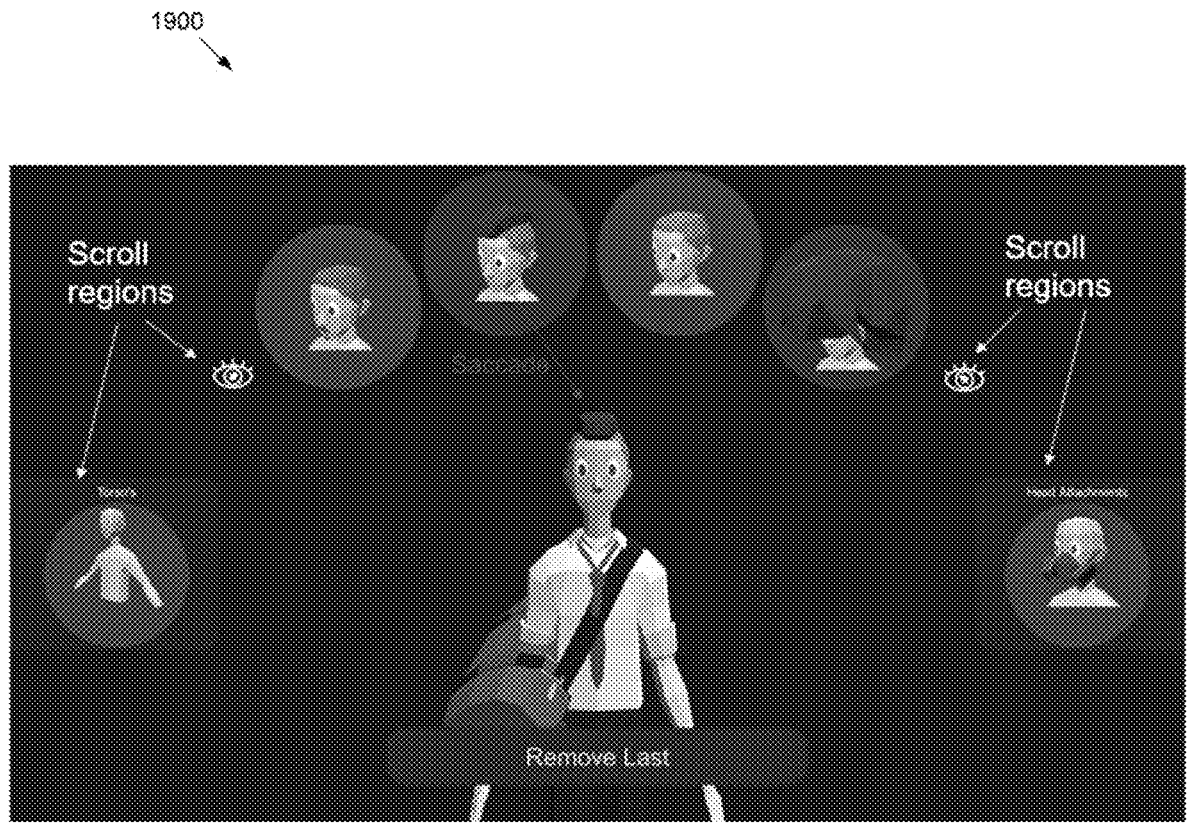
FIG. 19 depicts yet another graphical-user interface that can be used to configure an avatar.

FIG. 19 depicts yet another graphical-user interface that can be used to configure an avatar. As depicted in plot 1900, when a user looks at the "scroll" regions, objects appear from the direction of their gaze and scroll away from the scroll target. Once a property of the avatar is selected by a short fixation, it is highlighted. In some embodiments, a subsequent saccade towards the avatar then causes the avatar to inherit the property. In some embodiments, the direction and magnitude of the saccade (which can be calculated even in the presence of errors in accuracy) are used to trigger a change in an avatar (even when having multiple avatars).

Furthermore, as disclosed in U.S. Non-Provisional patent application Ser. No. 15/876,148 (now U.S. Pat. No. 10,824, 229), which is incorporated herein by reference, embodiments in accordance with the present disclosure enable saccade endpoint prediction based on detection of saccade dynamics. Such endpoint prediction can be used to increase the responsiveness of the user interface. In particular, since it enables the user interface to react even faster than the user's gaze, it is important to highlight the changes until the user's fixation settles on the target object.

It should be noted that other forms of feedback can also be used, such as auditory feedback upon selection or visual feedbacks in the periphery or along the saccade direction during the saccade. In addition, the ability to undo actions should be simple, and the undone actions may also be highlighted until the user's fixation returns to the avatar. In plot 1900, the categories of properties may also be selected using a similar scrolling and selecting process. It is important to note that these methods of signaling interest and intent through natural eye movements are not limited to objects inheriting properties, analogous to "drag and drop" actions that may be performed with a mouse or a capacitive touch interface.

In addition, the use of multimodal gestural inputs may be used to improve the robustness of actions in a user interface. For example, a VOR (vestibulo-ocular reflex) eye movement, which occurs when the eye fixates a target while the head is rotating, may be robustly captured by comparing IMU data to counter-rotation of the eye. A VOR in a given direction, combined with gaze position, may be used to implement swiping, pinch-to-zoom, pan, etc.

It should be further noted that, when implementing a blink-based input method, the target region may be highlighted when the users gaze is on it to indicate that a blink will trigger action. This highlight, among other potential cues (e.g., sound, vibration, etc.) may provide sufficient feedback to the user to suppress blinks in order to avoid false selections. In addition, the nature of the cue may be used to specify the type of action that would be triggered (e.g., select, back, undo, pan, zoom, etc.).

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

It is to be understood that the disclosure teaches just some examples of illustrative embodiments and that many variations of the invention can be devised by those skilled in the art, after reading this disclosure, and that the scope of the present invention is to be determined by the following claims.

What is claimed is:

1. An eye-tracking method comprising:
   establishing a plurality of test scan patterns for scanning a light signal in two dimensions over a region of the eye;
   determining a scan-pattern parameter for each of the plurality of test scan patterns;
   selecting a first scan pattern from the plurality of test scan patterns based on the plurality of scan-pattern parameters;
   scanning the light signal in the first scan pattern over the region of the eye through the effect of a microelectromechanical system (MEMS) device that is a two-axis device having a first axis characterized by a first resonant frequency and a second axis characterized by a second resonant frequency, wherein the scan pattern is a Lissajous pattern, and wherein the light signal is scanned by driving the first axis with a first periodic signal having a first drive frequency and driving the second axis with a second periodic signal having a second drive frequency;
   detecting a reflected signal from the corneal surface with a non-imaging photodetector configuration; and
   identifying a gaze direction for the eye based on the reflected signal.

2. The method of claim 1 wherein the scan-pattern parameter is selected from the group consisting of spatiotemporal scan density, a time required for the largest gap within the test scan pattern to converge below a feature-size threshold, a size of the largest gap within the test scan pattern at a first time, and a rate at which the test scan pattern precesses.

3. The method of claim 1 wherein the ratio of the first and second drive frequencies is a rational number.

4. The method of claim 1 further comprising selecting first and second drive frequencies that give rise to precession of the Lissajous pattern.

5. The method of claim 1 further comprising determining the first and second resonant frequencies.

6. The method of claim 1 further comprising providing the non-imaging photodetector configuration such that it includes a plurality of non-imaging photodetectors.

7. The method of claim 1,
   wherein each test scan pattern of the plurality thereof is based on the first periodic signal having a different first test frequency of a set thereof and the second periodic signal having a different second test frequency of a set thereof;
   wherein each of the set of first test frequencies is based on the first resonant frequency and a first offset frequency; and
   wherein each of the set of second test frequencies is based on the second resonant frequency and a second offset frequency.

8. The method of claim 7 further comprising:
   selecting the first and second drive frequencies based on the plurality of scan-pattern parameters.

9. The method of claim 8 further comprising selecting the scan-pattern parameter as spatiotemporal density, wherein the first and second drive frequencies are selected as the frequency pair that results in the highest spatiotemporal scan density.

10. The method of claim 7 wherein the scan-pattern parameter for each test scan pattern is determined by operations including:
    for a plurality of periods of the first test frequency, plotting the test scan pattern in phase space as a plurality of parallel scan lines;
    determining a plurality of separations, each separation being the distance between a different pair of adjacent parallel scan lines; and
    determining the scan-pattern parameter based on the plurality of separations.

11. The method of claim 10 further comprising:
    for each of the plurality of test scan patterns:
       (i) determining a baseline value for the largest separation; and
       (ii) computing a conversion time, wherein the conversion time is based on the number of periods of the first test frequency required for the largest separation to reach the baseline value; and
    selecting the first and second drive frequencies based on the plurality of conversion times.

12. An eye tracker comprising:
    a light source for providing a light signal;
    a scanner for steering the light signal in a Lissajous pattern over a region of an eye, wherein the scanner comprises a micromechanical system (MEMS) device that is a two-axis device having a first axis characterized by a first resonant frequency and a second axis characterized by a second resonant frequency;
    a non-imaging photodetector configuration that is configured to provide at least one output signal based on a reflected signal from the region; and
    a precessing system configured to:
       (i) establish a plurality of test scan patterns for scanning the light signal over the region of the eye;
       (ii) determine a scan-pattern parameter for each of the plurality of test scan patterns;

(iii) select a first scan pattern from the plurality of test scan patterns based on the plurality of scan-pattern parameters;

(iv) drive the first axis with a first periodic signal that is characterized by a first drive frequency, wherein the first periodic signal is based on the first scan pattern;

(v) drive the second axis with a second periodic signal that is characterized by a second drive frequency, wherein the second periodic signal is based on the first scan pattern; and (vi) determine a gaze direction of the eye based on the output signal.

13. The eye tracker of claim 12 wherein the scan-pattern parameter is selected from the group consisting of spatiotemporal scan density, a time required for the largest gap within the scan pattern to converge below a feature-size threshold, a size of the largest gap within the scan pattern at a first time, and a rate at which the scan pattern precesses.

14. The eye tracker of claim 12 wherein the ratio of the first and second drive frequencies is a rational number.

15. The eye tracker of claim 12 wherein the first and second drive frequencies give rise to a precession of the Lissajous pattern.

16. The eye tracker of claim 12 wherein non-imaging photodetector configuration includes a plurality of non-imaging photodetectors.

17. The eye tracker of claim 12 wherein the processor is further configured to:

(vii) for each of the plurality of test scan patterns, establishing its first periodic signal as a different first test frequency of a set thereof and its second periodic signal as a different second test frequency of a set thereof;

wherein each of the set of first test frequencies is based on the first resonant frequency and a first offset frequency; and wherein each of the set of second test frequencies is based on the second resonant frequency and a second offset frequency.

18. The eye tracker of claim 17 wherein the processor is further configured to (viii) select the first and second drive frequencies based on the plurality of scan-pattern parameters.

19. The eye tracker of claim 17 wherein the processor is further configured to, for each of the plurality of test scan patterns:

(viii) for a plurality of periods of the first test frequency, plot the test scan pattern in phase space as a plurality of parallel scan lines; and (ix) determine a plurality of separations, each separation being the distance between a different pair of adjacent parallel scan lines; and (x) determine a largest separation of the plurality of separations.

20. The eye tracker of claim 19 wherein the processor is further configured to:

(xi) determine a baseline value for the largest separation for each of the plurality of test scan patterns;

(xii) compute a conversion time for each of the plurality of test scan patterns, wherein the conversion time is based on the number of periods of the first test frequency required for the largest separation to reach the baseline value; and (xiii) select the first and second drive frequencies based on the plurality of conversion times.

* * * * *